(12) United States Patent
Liu et al.

(10) Patent No.: US 12,076,706 B2
(45) Date of Patent: Sep. 3, 2024

(54) FLUID PROCESSING IN ENCAPSULATED POROUS STRUCTURES

(71) Applicant: Molecule Works Inc., Richland, WA (US)

(72) Inventors: Wei Liu, Richland, WA (US); Anirudh Balram, Richland, WA (US)

(73) Assignee: Molecule Works Inc., Richland, WA (US)

( * ) Notice: Subject to any disclaimer, the term of this patent is extended or adjusted under 35 U.S.C. 154(b) by 857 days.

(21) Appl. No.: 17/092,290

(22) Filed: Nov. 8, 2020

(65) Prior Publication Data

US 2021/0138436 A1 May 13, 2021

Related U.S. Application Data

(60) Provisional application No. 62/933,096, filed on Nov. 8, 2019.

(51) Int. Cl.
*B01D 46/00* (2022.01)
*B01D 17/02* (2006.01)
(Continued)

(52) U.S. Cl.
CPC .... *B01J 20/28052* (2013.01); *B01D 17/0202* (2013.01); *B01D 46/0036* (2013.01);
(Continued)

(58) Field of Classification Search
CPC ............ B01D 17/0202; B01D 17/0036; B01D 46/0043; B01D 46/64; B01D 53/0407;
(Continued)

(56) References Cited

U.S. PATENT DOCUMENTS

| 4,346,051 A | 8/1982 | McFarlin |
| 5,446,264 A * | 8/1995 | Kondo ..................... H05B 3/12 |
| | | 219/205 |

(Continued)

FOREIGN PATENT DOCUMENTS

| AU | 2004320325 A1 | 12/2005 |
| EP | 0790920 B1 | 3/2003 |

(Continued)

OTHER PUBLICATIONS

Korean Intellectual Property Office, International Preliminary Report on Patentability and Written Opinion Issued in International Patent Application No. PCT/US2020/059592, mailed May 19, 2022 (6 pages).

(Continued)

*Primary Examiner* — Minh Chau T Pham
(74) *Attorney, Agent, or Firm* — THE MARBURY LAW GROUP, PLLC

(57) ABSTRACT

A porous material structure and device are described and shown to enhance the mass transfer and/or heat transfer at low pressure drops for removal of certain molecular species from a fluid by adsorption and/or catalytic reaction. The porous structure of active materials comprising packed fine particles of adsorbents or catalysts is encapsulated with a thin membrane to provide large interfacing area with the fluid per unit volume for rapid mass transfer between the porous structure and fluid. The thin membrane also blocks particulate from getting into the porous structure of the active material. For the process involving significant heat of adsorption and/or reaction, the another surface of the porous structure of the active material is encapsulated with a thin non-permeable sheet to interface with a thermal fluid for rapid heat transfer between the porous structure and the thermal fluid. The device can be used for removal of $CO_2$, moisture, and hydrocarbon molecules from a gas stream (Continued)

with rapid in-situ regeneration. The device can be used for removal of water from water-containing liquid fluids, such as solvents and oils. The device can be used for removal of bacteria, virus, salts, and molecular contaminants from one water simultaneously.

34 Claims, 28 Drawing Sheets

(51) Int. Cl.
| | |
|---|---|
| B01D 53/04 | (2006.01) |
| B01D 53/26 | (2006.01) |
| B01D 53/62 | (2006.01) |
| B01D 53/72 | (2006.01) |
| B01D 69/14 | (2006.01) |
| B01J 20/28 | (2006.01) |
| B01J 35/50 | (2024.01) |
| B01J 35/61 | (2024.01) |
| C02F 1/469 | (2023.01) |
| C02F 101/10 | (2006.01) |
| C02F 101/34 | (2006.01) |

(52) U.S. Cl.
CPC ....... *B01D 53/0407* (2013.01); *B01D 53/261* (2013.01); *B01D 53/62* (2013.01); *B01D 53/72* (2013.01); *B01D 69/147* (2013.01); *B01J 20/28004* (2013.01); *B01J 20/28016* (2013.01); *B01J 20/28061* (2013.01); *B01J 20/28064* (2013.01); *B01J 20/28066* (2013.01); *B01J 35/50* (2024.01); *B01J 35/615* (2024.01); *B01J 35/617* (2024.01); *B01J 35/618* (2024.01); *C02F 1/4691* (2013.01); *B01D 2253/108* (2013.01); *B01D 2257/504* (2013.01); *B01D 2257/708* (2013.01); *B01D 2257/80* (2013.01); *C02F 2101/10* (2013.01); *C02F 2101/34* (2013.01)

(58) Field of Classification Search
CPC .. B01D 53/261; B01D 53/323; B01D 69/147; B01J 20/28052; B01J 20/28016; B01J 20/28061; B01J 20/28064; B01J 20/28066
USPC ........ 96/134; 55/523, DIG. 30; 60/299, 775; 422/177, 178, 180; 219/205, 444
See application file for complete search history.

(56) References Cited

U.S. PATENT DOCUMENTS

| | | | |
|---|---|---|---|
| 5,650,221 A | 7/1997 | Belding et al. | |
| 5,764,850 A * | 6/1998 | Olstad | F23D 14/66 219/544 |
| 5,906,743 A | 5/1999 | Cohn et al. | |
| 6,003,305 A * | 12/1999 | Martin | F01N 3/037 60/303 |
| 6,126,723 A | 10/2000 | Drost et al. | |
| 6,274,041 B1 | 8/2001 | Williamson et al. | |
| 6,328,936 B1 * | 12/2001 | Roychoudhury | F01N 3/2026 422/177 |
| 6,554,886 B2 | 4/2003 | Yoshikawa et al. | |
| 6,565,627 B1 | 5/2003 | Golden et al. | |
| 6,692,555 B2 | 2/2004 | Oda et al. | |
| 6,824,592 B2 | 11/2004 | Monzyk et al. | |
| 6,974,496 B2 | 12/2005 | Wegeng et al. | |
| 7,077,891 B2 | 7/2006 | Jaffe et al. | |
| 7,081,201 B2 | 7/2006 | Bassett et al. | |
| 7,291,208 B2 | 11/2007 | Dauber et al. | |
| 7,311,832 B2 | 12/2007 | Demmer et al. | |
| 8,382,884 B2 * | 2/2013 | Okayama | G01N 27/226 60/275 |
| 8,524,182 B2 * | 9/2013 | Grubert | F01N 3/035 60/299 |
| 8,673,059 B2 | 3/2014 | Leta et al. | |
| 8,927,078 B2 | 1/2015 | Chau et al. | |
| 9,079,136 B2 | 7/2015 | Liu et al. | |
| 9,669,146 B2 | 6/2017 | Johns et al. | |
| 9,908,093 B2 | 3/2018 | Simmons et al. | |
| 10,363,516 B2 | 7/2019 | Sundaram | |
| 11,285,425 B2 | 3/2022 | Sauerbeck et al. | |
| 2002/0139746 A1 | 10/2002 | Koslow | |
| 2003/0111404 A1 | 6/2003 | Koslow | |
| 2003/0205140 A1 | 11/2003 | Flaugher et al. | |
| 2004/0118287 A1 | 6/2004 | Jaffe et al. | |
| 2007/0062862 A1 | 3/2007 | Hughes et al. | |
| 2007/0238377 A1 | 10/2007 | Kato | |
| 2011/0143019 A1 * | 6/2011 | Mosso | C23C 16/56 427/209 |
| 2011/0206572 A1 | 8/2011 | McKenna et al. | |
| 2013/0180917 A1 | 7/2013 | Chu et al. | |
| 2014/0366738 A1 | 12/2014 | McKenna et al. | |
| 2015/0139862 A1 | 5/2015 | Chen et al. | |
| 2016/0033081 A1 | 2/2016 | Coleman et al. | |
| 2017/0036170 A1 | 2/2017 | Ryan | |
| 2018/0085703 A1 | 3/2018 | Landskron | |
| 2018/0126322 A1 | 5/2018 | O'Coin et al. | |
| 2018/0140966 A1 | 5/2018 | Brahem et al. | |
| 2018/0264437 A1 | 9/2018 | Le Bot et al. | |
| 2018/0272260 A1 | 9/2018 | Robertson et al. | |
| 2021/0077978 A1 | 3/2021 | Lai et al. | |
| 2021/0086162 A1 | 3/2021 | Takeuchi et al. | |
| 2021/0093993 A1 | 4/2021 | Strand et al. | |
| 2021/0291140 A1 | 9/2021 | Brito Lopes et al. | |

FOREIGN PATENT DOCUMENTS

| | | | |
|---|---|---|---|
| EP | 1 582 248 | A1 | 10/2005 |
| WO | 02/45847 | A2 | 6/2002 |
| WO | 2011/094296 | A1 | 8/2011 |
| WO | 2015/047598 | A3 | 4/2015 |
| WO | 2020254208 | A1 | 12/2020 |
| WO | 2021259760 | A1 | 12/2021 |

OTHER PUBLICATIONS

Extended European Search Report in EP20885273.1, mailed Dec. 5, 2023, 12 pages.
Knox, et al., Engineered Structured Sorbents for the Adsorption of Carbon Dioxide and Water Vapor from Manned Spacecraft Atmospheres: Applications and Modeling 2007/2008, Jan. 2008—2094, 9 pages.
International Search Report and the Written Opinion of the International Searching Authority received in related International Application No. PCT/US2020/059592 dated Feb. 26, 2021.
European Patent Office, Response to Office Action filed in corresponding European Patent Application No. 20885273.1 on Jan. 7, 2023.
International Search Report and Written Opinion for International Application No. PCT/US2023/013351, mailed Jun. 8, 2023, 9 pages.
European Patent Office, Response to Office Action filed in corresponding European Patent Application No. 20885273.1 on Jun. 22, 2024, 17 pages.

* cited by examiner (b). Regenerated MEPS plates (a). MEPS plates of three different thicknesses

FLUID PROCESSING IN ENCAPSULATED POROUS STRUCTURES

RELATED APPLICATIONS

This application claims the benefit of U.S. Provisional Patent Application No. 62/933,096, filed on Nov. 8, 2019, the entire contents of which are incorporated herein by reference for all purposes.

FIELD OF INVENTION

The present disclosure is directed to fluid processing in general and, more specifically, to fluid processing in encapsulated porous structure.

BACKGROUND

In fluid processing environments, particles of active material are often used to adsorb or react with species that is to be removed from a fluid stream. The result is lower concentration of the removed species in the fluid stream as the fluid stream continues to flow without interruption. At large flow volumes required for many industrial uses, however, the effectiveness of particles in removing species from the fluid stream is subject to trade-offs between fluid dynamics of the fluid stream through the particles and mass transfer between the fluid stream and the particles.

For example, packed beds of particles of active material are commonly used to enhance contact between the particles of active material and fluid streams to achieve industrial-scale throughput. In such packed beds of particles of active material, smaller particles sizes are desirable for enhancing mass transfer rate between the particles and the fluid stream moving through the fixed particles. However, to avoid crushing the particles with the fluid stream moving through voids between the particles, large particle sizes are often needed to keep pressure drop through the particles below a threshold value. Given these competing considerations with respect to particle size, packed beds are not appropriate fluid processing solutions for certain flow regimes.

As another example, fluidized beds can provide a combination of low pressure drops and rigorous contact between particles of active material and a fluid stream having a large flow volume. The particles in fluidized beds, however, can have limited useful life. In particular, mixing between the particles and the fluid stream in a fluidized bed can reduce the particles to fines and/or result in particle loss from the fluidized bed as a result of entrainment of the particles into the fluid stream that is ultimately carried out of the fluidized bed. Further, the effectiveness of fluidized beds can be adversely impacted by conditions that result in a portion of the fluid stream bypassing the particles in the fluidized bed. Thus, fluidized beds are useful over limited flow regimes and, even within such regimes, are complicated to operate.

Accordingly, there remains a need for enhancing species removal from large volumes of fluid through mass transfer between particles of active material while preserving structural integrity and effectiveness of such particles over a range of operating conditions.

SUMMARY

Various aspects include apparatuses and methods for filtering fluids. For example, in some embodiments, a filter may include a membrane encapsulated porous structure (MEPS). Various aspects may include a filter for processing fluid, wherein the filter includes: a porous structure including one or more chemically active materials; and a frame including a first sheet, a second sheet, and a seal collectively defining a volume, the volume having a thickness between the first sheet and the second sheet and a length parallel to the first sheet and the second sheet, wherein the thickness of the volume is less than the length of the volume, the first sheet is fluid permeable, the porous structure spans each dimension of the volume, and in a direction perpendicular to the length of the volume, compressive strength of the frame alone is greater than compressive strength of the porous structure alone.

In some aspects of the filter for processing fluid, the porous structure may be formed of particles packed in the volume, the particles having an average particle size less than about 200 microns and a minimum particle size of greater than about 0.03 microns.

In some aspects of the filter for processing fluid, the porous structure may have a void fraction greater than about 0.3 and less than about 0.8, and the one or more chemically active materials have a BET surface area greater than about 100 m2/g and less than about 5000 m2/g.

In some aspects of the filter for processing fluid, the one or more chemically active materials include one or more of an adsorbent, a sorbent, or a catalyst.

In some aspects of the filter for processing fluid, a ratio of an interface area of the first sheet and the volume spanned by the porous structure is greater than about 10 $m^2/m^3$ and less than about 10,000 $m^2/m^3$.

In some aspects of the filter for processing fluid, the first sheet may have a sheet thickness of greater than about 20 microns and less than about 200 microns, and the first sheet may have an open area fraction of greater than 30 percent and less than about 65 percent.

In some aspects of the filter for processing fluid, the second sheet may be nonpermeable to fluid and has a thermal conductivity greater than about 10 W/m·K.

In some aspects of the filter for processing fluid, the second sheet may include carbon fiber composite, a metal, or a combination thereof.

In some aspects of the filter for processing fluid, the one or more chemically active materials may be regeneratable via heat conductible into the volume via the second sheet.

In some aspects of the filter for processing fluid, the second sheet may be fluid permeable and flow moving in a direction from the first sheet to the second sheet having a higher pressure drop through the first sheet than through the porous structure in the volume.

In some aspects of the filter for processing fluid, the porous structure may include a partition extending through the porous structure to separate a first portion of the porous structure from a second portion of the porous structure, and the partition may be fluid permeable to permit flow from the first sheet to the second sheet, via the partition.

In some aspects of the filter for processing fluid, the partition may electrically isolate the first portion of the porous structure from the second portion of the porous structure, the first sheet may be a first electrode, the second sheet may be a second electrode, and the first electrode and the second electrode may be oppositely charged.

In some aspects of the filter for processing fluid, the first sheet may be a first cylinder, the second sheet may be a second cylinder, the volume may be an annular region between the first cylinder and the second cylinder, the length of the volume may be a circumference of the first cylinder and the thickness of the volume may be a dimension of the annular region between the first cylinder and the second cylinder.

In some aspects of the filter for processing fluid, a portion of the seal may be releasable from the first cylinder and the second cylinder with the annular region defined therebetween, and the porous structure may be removable from the annular region in a direction parallel to the first sheet and the second sheet.

In some aspects of the filter for processing fluid, one or both of the first sheet and the second sheet may be releasably securable to the seal, and the porous structure may be removable from the volume.

Other various aspects may include a system for processing fluid, wherein the system for processing fluid may include: a plurality of filters, wherein each filter may include a frame and a porous structure, wherein each porous structure may include one or more chemically active materials, and each frame may include a first sheet, a second sheet, and a seal collectively defining a volume, wherein the volume has a length parallel to the respective first sheet, each first sheet may be permeable to a first fluid flowing along the respective first sheet, each dimension of the volume may be spanned by the respective porous structure corresponding to the respective frame corresponding to the given volume and, in a direction perpendicular to the length of each volume, compressive strength of the respective frame alone may be greater than compressive strength of the respective porous structure alone. The system for processing fluid may further include a chassis supporting the plurality of filters spaced apart from one another with the first sheets of the plurality of filters forming a plurality of first channels and the second sheets of the plurality of filters forming a plurality of second channels.

In some aspects, the system for processing fluid may further include a plurality of first channel spacers and a plurality of second channel spacers, wherein each first channel spacer may be disposed in a respective one of the plurality of first channels, and each second channel spacer may be disposed in a respective one of the plurality of second channels.

In some aspects, the system for processing fluid may further include a manifold defining a first inlet portion, a first outlet portion, a second inlet portion, and a second outlet portion, wherein a first flow path may be defined from the first inlet portion to the first outlet portion via the plurality of first channels, a second flow path may be defined from the second inlet portion to the second outlet portion via the plurality of second channels, and the first flow path and the second flow path may correspond to different directions of flow at least through the plurality of filters.

Various aspects include a method of fabricating a filter for processing fluid, the method may include the steps of introducing one or more chemically active materials into a cavity defined by a seal and one of a plurality of sheets; covering the cavity, and the one or more chemically active materials therein, with another one of the plurality of sheets, wherein the seal and the plurality of sheets form a frame and collectively define a volume, a thickness of the volume between the plurality of sheets is less than any other dimension of the volume; and forming a porous structure including the one or more chemically active materials, wherein the porous structure spans each dimension of the volume, and the porous structure is in fluid communication with an environment beyond the frame via fluid permeability of one or more of the plurality of sheets.

In some aspects, the method may further include forming the porous structure by heating a slurry of the one or more chemically active materials in a binder to form the porous structure in the volume or placing one or more preformed sheets of the porous structure in the cavity.

BRIEF DESCRIPTION OF THE FIGURES

Like reference symbols in the various drawings indicate like elements.

DETAILED DESCRIPTION

Figure 1A:
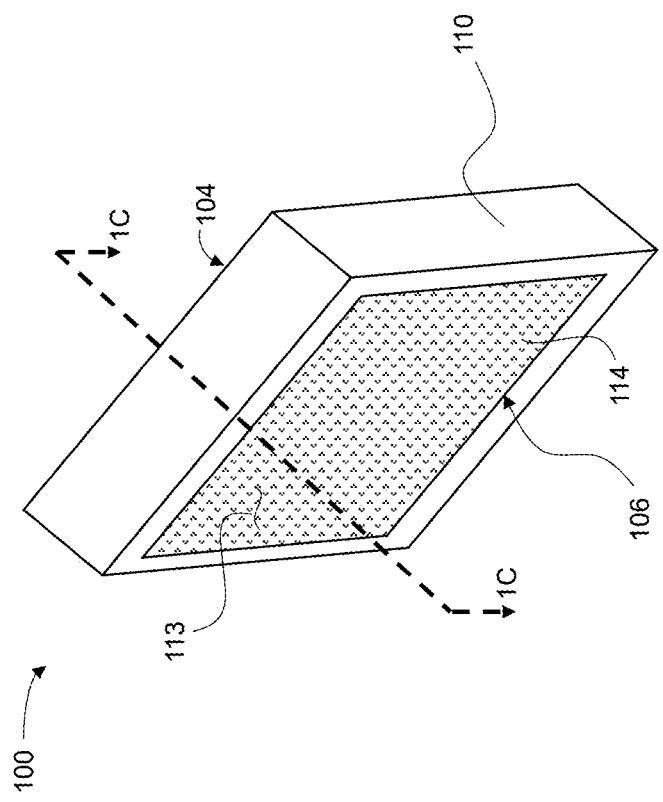
FIG. 1A is a perspective view of a filter for processing fluid.

The embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

As used herein, the term "chemically active material" shall be understood to include any material that may physically or chemically interact with a species (e.g., water vapor, carbon dioxide, hydrocarbons, or a combination thereof, in the case of gas processing or dehydration of oils or solvents in the case of fluid processing, or ions in the case of desalination) within a flow of fluid moving past the given material to reduce the concentration of the species in the flow. Such physical or chemical interaction between the chemically active material and the species may include, for example, physical removal of the species from the flow or chemically converting the species in the flow. Further, or instead, the physical or chemical interaction between the chemically active material and the species in the flow may be carried out with or without the addition of energy (e.g., electrical energy, heat, or a combination thereof). Unless otherwise specified or made clear from the context, all references to chemically active materials herein shall be understood to include such material in an inactive state in instances in which chemical activity of the given material requires the addition of energy.

Figure 1B:
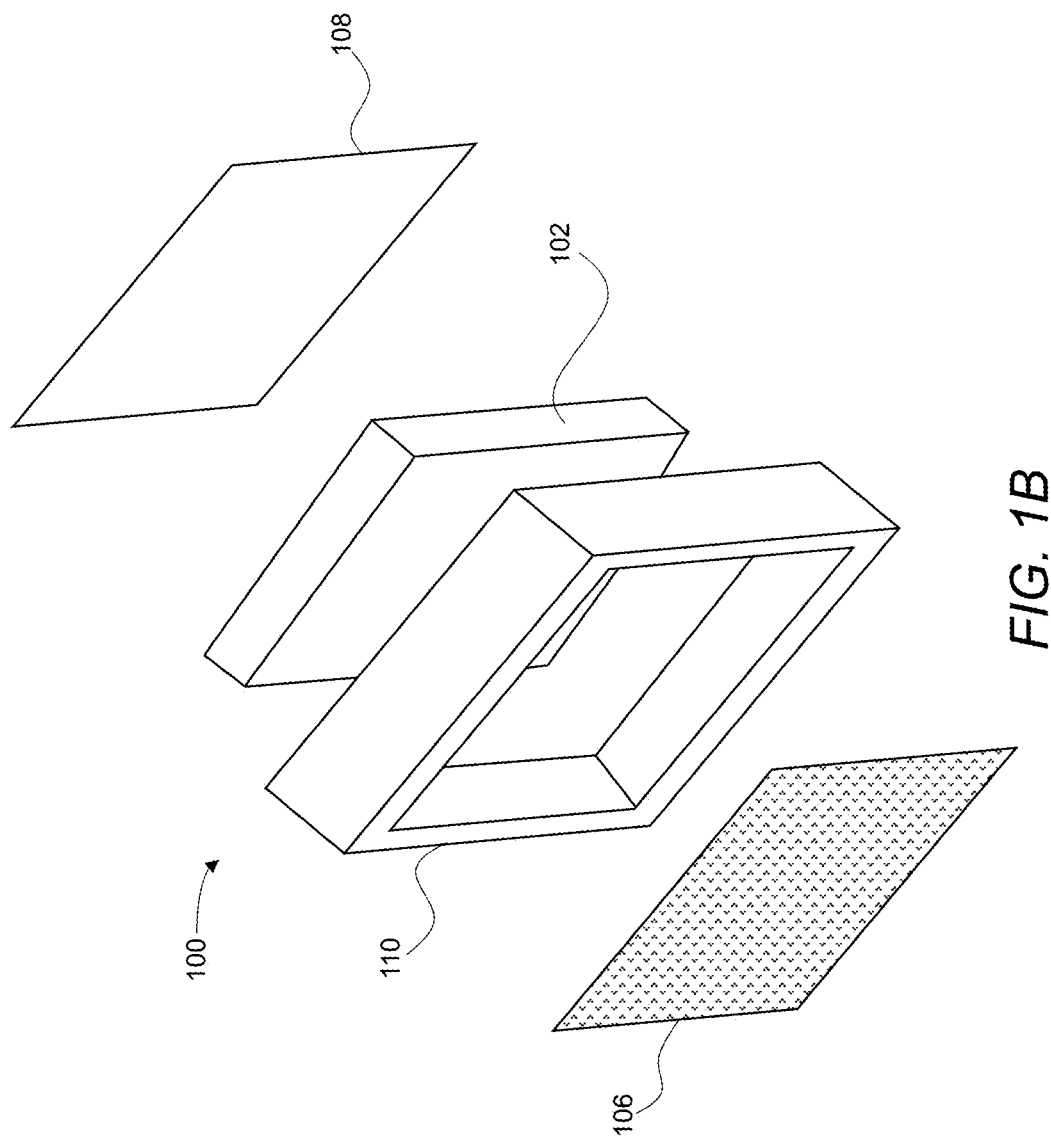
FIG. 1B is an exploded view of the filter of FIG. 1A.
Figure 1C:
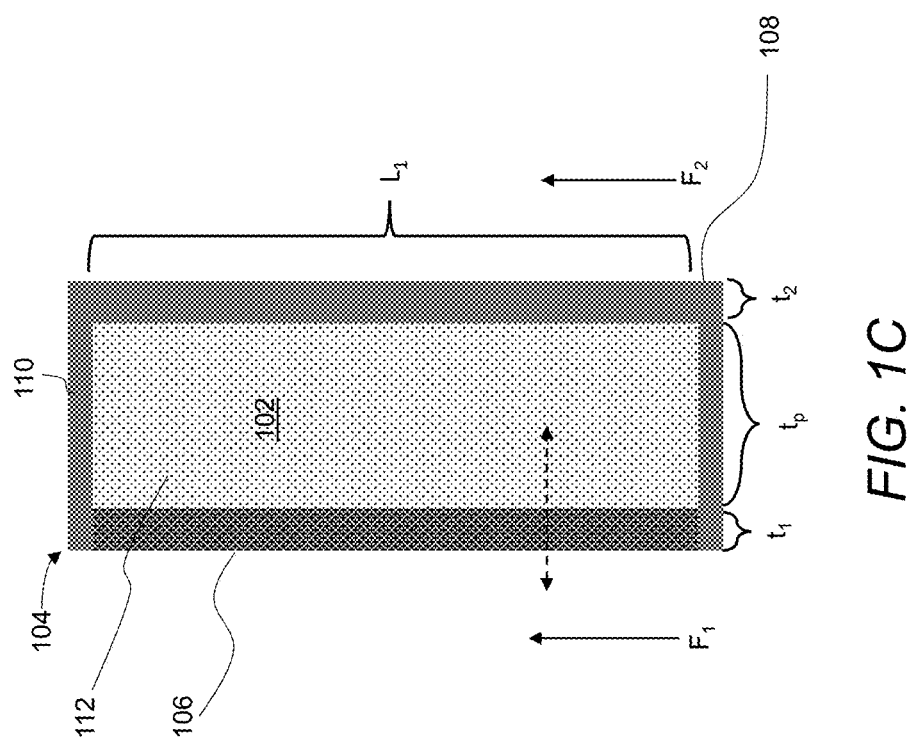
FIG. 1C is a side view of a cross-section of the filter of FIG. 1A, the cross-section taken along the cross-section 1C-1C in FIG. 1A.

Referring now to FIGS. 1A-1C, a filter 100 may include a porous structure 102 and a frame 104. As described in greater detail below, the porous structure 102 may include one or more chemically active materials useful for removing at least one species from a flow of fluid moving in the porous structure 102. The frame 104 may include a first sheet 106, a second sheet 108, and a seal 110 collectively defining a volume 112. The porous structure 102 may span each dimension of volume 112, thus providing a useful combination of physicochemical and structural advantages. For example, under otherwise identical conditions, the porous structure 102 spanning each dimension of the volume 112 leaves little or no unreactive volume in the volume 112. Thus, the porous structure 102 maximizes the surface area for mass transfer of molecules. In addition, the porous structure 102 reduces the likelihood of bypass or otherwise uneven distribution of mass transfer along the porous structure 102, each of which promotes mass transfer between the fluid and the one or more chemically active materials of the porous structure 102. Additionally, or alternatively, as compared to a porous structure having a smaller size than the volume 112, the porous structure 102 spanning each dimension of the volume 112 may reduce the likelihood of unintended relative movement between the porous structure 102 and the frame 104. This reduction of unintended movement, in turn reduces the likelihood of unintended damage to the porous structure 102 during storage, transport, installation, or use. Further or instead, in some implementations, the porous structure 102 spanning each dimension of the volume 112 may facilitate use of chemically active materials that are available as particles—a common commercially available form factor that is amenable to being packed to form the porous structure 102 in the volume 112 and, by being encapsulated tightly within the volume 112, may facilitate retaining the one or more chemically active materials within the volume 112 throughout use of the filter 100.

In use, as also described in greater detail below, a first fluid $F_1$ flowing along the first sheet 106 of the frame 104 may be in fluid communication with the porous structure 102 via at least fluid permeability of the first sheet 106. Additionally, or alternatively, a second fluid $F_2$ flowing along the second sheet 108 of the frame 104 may be in thermal communication with the porous structure 102 in the volume 112 via thermal conductivity of material of the second sheet 108. As an example, the flow of the second fluid $F_2$ may be controlled (e.g., to add heat, remove heat, or some combination thereof) to maintain the porous structure 102 within a temperature range useful for effectiveness of the one or more chemically active materials of the porous structure 102 in treating the first fluid $F_1$ flowing in the porous structure 102. In certain instances, the flow of the second fluid $F_2$ may be further, or instead, controlled for in-situ regeneration of the one or more chemically active materials of the porous structure 102 within the volume 112. For example, as described in greater detail below, the second fluid $F_2$ may be switched from cold water to hot water as necessary to regenerate an adsorbent that forms at least a portion of the porous structure 102 and has become saturated such that it has little or no useful chemical activity remaining. Accordingly, exemplary uses of the filter 100 may include, but are not limited to, removal of $CO_2$, moisture, and hydrocarbon molecules from a gas stream with rapid in-situ regeneration, removal of water from water-containing liquids (e.g., solvents and oils), or removal of bacteria, micro-organisms, virus, inorganic particles, organic particles, hybrid particles, and/or molecular contaminants from water individually or simultaneously.

In general, the porous structure 102 has a geometry that balances competing considerations of suitably exposing the first fluid $F_1$ to the one or more chemically active materials of the porous structure 102 while having low enough flow resistance to permit the first fluid $F_1$ to flow adequately into the porous structure 102 in the volume 112. More specifically, the porous structure 102 may have an interface area-to-volume ratio that facilitates balancing these disparate performance requirements. In this context, the interface area of the porous structure 102 shall be understood to be the surface area of the portion of the porous structure 102 in contact with the first sheet 106 in the volume 112 such that the interface area of the porous structure 102 is inversely related to flow resistance of the first fluid $F_1$ into the porous structure 102. Additionally, or alternatively, the volume of the porous structure 102 shall be understood to correspond to the overall dimensions of the volume 112 defined by the frame 104, given that the porous structure 102 spans each dimension of the volume 112. That is, a thickness $t_p$ of the volume 112 spanned by the porous structure 102 between the first sheet 106 and the second sheet 108 is the third dimension forming the volume of the porous structure 102. As may be appreciated from this description of the volume of the porous structure 102, given that the porous structure 102 spans each dimension of the volume 112, the dimensions of the volume 112 shall be understood to be interchangeable with dimensions of the porous structure 102, unless otherwise specified or made clear from the context. For example, returning to the foregoing description of the volume of the porous structure 102, the thickness $t_p$ shall be understood to correspond to the thickness of the volume 112, as well as the thickness of the porous structure 102 spanning each dimension of the volume 112.

In view of the foregoing, it may be appreciated that a large interface area-to-volume ratio (e.g., greater than about 10 $m^2/m^3$) of the porous structure 102 may be generally useful for balancing competing considerations of mass transfer and fluid flow in the porous structure 102. That is, a large interface area-to-volume ratio may represent a geometry of the porous structure 102 in which a large interface area between the porous structure 102 and the first sheet 106 presents a low resistance to the flow of the first fluid $F_1$ while also contributing to a volume of the porous structure 102 large enough for suitable exposure of the first fluid $F_1$ to the one or more chemically active materials to achieve suitable mass transfer. Stated differently, a large interface area of the porous structure 102 contributes to a decrease in flow resistance and to an increase in mass transfer—each of which is desirable in achieving effective treatment of the first fluid $F_1$ in the porous structure 102. By contrast, however, a large thickness $t_p$ of the porous structure 102 may result in mass transfer resistance or flow permeation resistance that is too high to facilitate treating the first fluid $F_1$ in the porous structure 102. Thus, taken together, these considerations suggest that it is advantageous to form the porous structure 102 with an interface area that is as large as possible while having a thickness $t_p$ that is as small as possible.

While these aforementioned trends apply to the sizing of the dimensions of porous structure 102, practical considerations nevertheless serve to bound dimensions of the porous structure 102. For example, although it is generally desirable for the porous structure 102 to have a form factor corresponding to an interface area that is as large as possible, challenges such as cost, manufacturability, storage, handling, installed footprint, or a combination thereof may effectively limit a maximum permissible size of the interface area of the porous structure 102. Additionally, or alternatively, although it is generally desirable to have a thickness $t_p$ that is as small (i.e., thin) as possible, the practical upper limit of the size of the interface area of the porous structure 102 may, in turn, serve as a practical lower limit of the thickness $t_p$ of the porous structure 102. That is, in view of the practical limits on interface area, the thickness $t_p$ of the porous structure 102 must be at least large enough to ensure that the volume of the porous structure 102 has enough of the one or more chemically active materials to achieve suitable species removal from the first fluid $F_1$.

Having described the porous structure 102 in terms of the interface area-to-volume ratio, it shall be appreciated that this ratio reduces to a ratio of a length $L_1$ of the porous structure 102 to the thickness $t_p$ of the porous structure 102 for cubic volumes, wherein the length $L_1$ of the porous structure 102 is parallel to the first sheet 106 defining the volume 112 spanned by the porous structure 102. That is, the interface area-to-volume ratio of the porous structure 102 having a form factor of a cubic volume is independent of the depth (the dimension into the page in FIG. 1C) of the porous structure 102. Further, for a porous structure having an annular region between two cylindrical sheets, the ratio of length to thickness of such a porous structure is non-linearly related to the interface area-to-volume ratio, but is nevertheless informative with respect to geometry that promotes mass transfer while offering low flow resistance, such as any one or more of the cylindrical form factors discussed below.

Accordingly, in the description that follows the ratio of length to width of a given geometry of a porous structure shall be understood to be used interchangeably with the interface area-to-volume ratio of that particular porous structure, unless otherwise specified or made clear from the context. Thus, for example, with respect to the porous structure 102, the ratio of the length $L_1$ to the thickness $t_p$ shall be understood to be interchangeable with the interface area-to-volume ratio. As a more specific example, a high interface area-to-volume ratio indicative of suitable performance of the porous structure 102 may be characterized by a geometry in which the length $L_1$ of the porous structure 102 is at least greater than the thickness $t_p$ of the porous structure 102 and, in certain instances, may be at least about 5 times greater than the thickness $t_p$ of the porous structure.

In certain implementations, the relationship between the interface area and volume of the porous structure 102 may offer significant advantages with respect to the efficient use of space for processing a given amount of fluid. For example, in certain implementations, the thickness $t_p$ of the porous structure 100 may be greater than about 0.1 mm and less than about 100 mm to facilitate, for example, adequately processing a high volume (e.g., a space velocity of greater than about 1000 1/h) of the first fluid $F_1$. The thickness $t_p$ of the porous structure 100 in this range may correspond to an interface-to-surface area of greater than about 10 $m^2/m^3$ and less than about 10,000 $m^2/m^3$. As compared to conventional packed beds requiring thicknesses on the order of a few meters to tens of meters for processing a similar amount of fluid, the thickness $t_p$ of the porous structure 102 may reduce costs associated with one or more of transportation, installation, maintenance, and space required for filtration of a given amount of the first fluid $F_1$ in an industrial installation.

In general, the porous structure 102 may include any one or more chemically active materials useful for removing one or more species from the first fluid $F_1$ flowing along the first sheet 106 and into the porous structure 102 in the volume 112. As used in this context, removal of a given species shall be understood to include any manner and form of reducing volumetric concentration of the given species as the first fluid $F_1$ is processed by the one or more chemically active materials in the porous structure 102. For example, removal of a species may include physical removal of the species, chemical conversion of the species, or a combination thereof. Thus, as a more specific example, the one or more chemically active materials may include adsorbents, sorbents, catalysts, or a combination thereof. As a still more specific example, the one or more chemically active materials forming at least a portion of the porous structure 102 may include, but are not limited to, one or more of zeolite, activated carbon, porous carbon, nanocarbon fibers, alumina, silica, polymer/inorganic composite, or resin.

In some instances, the porous structure 102 may include packed fine particles of the one or more chemically active materials. This may be particularly advantageous with respect to leveraging off-the-shelf and, therefore, readily sourced forms of the one or more chemically active materials, such as active adsorbent and/or catalyst materials. Further, because porous particles of chemically active materials are manufactured for a variety of industrial uses, these particles may be readily procured according to a variety of specifications (e.g., average particle size, minimum particle size, etc.)—to within tightly controlled tolerances—to achieve predictable and consistent performance with respect to species removal. For example, the porous structure 102 may include particles having an average size of less than about 200 microns and a minimum particle size of greater than about 0.03 microns. Further, or instead, to facilitate achieving a target pore diffusion resistance of the porous structure 102, the primary particle or crystal size of certain microporous materials may be specified (e.g., about greater than about 30 nm or less than about 5000 nm). Still further in addition, or in the alternative, the Brunauer-Emmett-Teller (BET) surface area of the particles used to form at least a portion of the porous structure 102 may be specified (e.g., greater than about 10 $m^2/g$ and less than about 5000 $m^2/g$), thus providing an indication of how much of a chemically active surface area may be in the porous structure 102, once formed from the particles. In some embodiments, the use of packed fine particles of the one or more chemically active materials may advantageously facilitate mixing materials, such as may be useful for one or more of removing a plurality of different species from the first fluid $F_1$ or removing a given species from the first fluid $F_1$ according to a combination of removal processes.

Continuing with the example of packed fine particles, the use of packed fine particles in the formation of the porous structure 102 may provide an additional degree of control over flow through the porous structure 102. That is, in addition to porosity of the particles themselves, the spacing between the particles may be controlled. By controlling the spacing between the particles, control over the ability of the first fluid $F_1$ to flow between the particles may be provided. More specifically, the spacing between the particles of the porous structure 102 may be controlled based on how tightly the particles of the one or more chemically active materials are packed together to form at least a portion of the porous structure 102. As an example, the porous structure 102 may be formed with an overall void fraction (i.e., fraction of void to the overall volume) greater than about 0.3 and less than about 0.8.

While the porous structure 102 has been described as being at least partially formed of particles of one or more chemically active materials, it shall be appreciated that the porous structure 102 may be additionally, or alternatively, formed of any one or more of various different base materials. Examples of base materials that may be further, or in the alternative, used to form the porous structure include, but are not limited to: porous sheets, porous plates, porous fibers, or a combination thereof.

In general, the frame 104 may protect the porous structure 102 from damage. That is, the porous structure 102, at least by virtue of being porous and having a high interface area-to-volume ratio, may have limited mechanical strength by itself. However, with the porous structure 102 spanning each dimension of the volume 112, the frame 104 allows the first fluid $F_1$ to reach the porous structure 102 while providing resistance to one or more forces that would otherwise be exerted on the porous structure 102 by the first fluid $F_1$ and keeping the porous structure 102 contained within the volume 112. Stated differently, frame 104 advantageously decouples certain considerations related to fluid processing performance of the porous structure 102 from many considerations related to mechanical strength of the porous structure 102. In doing so, the frame 104 facilitates achieving robust and effective performance of the porous structure 102 over a broader range of conditions than would otherwise be possible without the mechanical strength provided by the frame 104.

The frame 104 may provide protection to the porous structure 102 with respect to any one or more of various different forces that may be experienced by the filter 100 during use. In particular, the frame 104 may provide compressive strength in a direction perpendicular to the length of the volume 112. That is, in a direction perpendicular to the length of the volume 112, compressive strength of the frame 104 alone may be greater than compressive strength of the porous structure 102 alone. Accordingly, the frame 104 reduces the likelihood that the porous structure 102 may get crushed, dislodged, or otherwise disturbed by the flow of the first fluid $F_1$ moving past the filter 100. This is significant, for example, because many adsorbents and catalytic materials have poor compressive strength.

The first sheet 106 of the frame 104 may be fluid permeable such that at least a portion of the first fluid $F_1$ (e.g., certain molecules) flowing along the first sheet 106 in the direction parallel to the length $L_1$ of the volume 112 may move through the first sheet 106 and diffuse into the porous structure 102. For example, the first sheet 106 may have a major surface 113 defining a plurality of pores 114 extending through the first sheet 106. The plurality of pores 114 may allow at least a portion of the first fluid $F_1$ to flow through. The total open area of the pores 114 may be greater than about 30 percent and less than about 65 percent of the surface area of the major surface 113 of the first sheet 106. As a more specific example, the pores 114 may be substantially free of pores greater than about 10 microns (e.g., less than about 5 percent of pores may be greater than about 10 microns), with most pore sizes in the range of greater than about 0.1 microns and less than about 2 microns. Such small and uniform pore size may be useful, for example, for filtering bacteria and small particulates from the first fluid $F_1$ while facilitating encapsulation of nano-sized particles of the porous structure 102 within the volume 112. Additionally, or alternatively, the first sheet 106 may have a gas permeance greater than about $1 \times 10^{-4}$ mol/(m²·s·Pa) and/or a water permeability greater than about 1000 liter/(m²·h·bar), as may be useful for achieving low resistance to mass transfer and/or convective flow during processing of gas or liquid, respectively. An example of a fluid permeable membrane that may be useful as the first sheet 106 is described in U.S. Pat. No. 9,079,136 B2, entitled "Thin, Porous Metal Sheets and Methods of Making the Same," the entire contents of which are hereby incorporated herein by reference.

In some embodiments, the first sheet 106 may be as thin as possible while providing mechanical strength suitable for protecting the porous structure 102 under normal operating conditions. That is, as compared to thicker sheets, the thinness of the first sheet 106 may be advantageous for reducing volume and weight fraction of the first sheet 106 in the overall filter 100. Thus, for example, the first sheet 106 may have a first sheet thickness $t_1$ that is less than about 3 mm (e.g., greater than about 20 microns and less than about 200 microns). In some embodiments, the first sheet 106 may be formed as a thin material that has sufficient mechanical strength to retain a shape (e.g., a flat shape or a cylindrical shape) at least in the presence of force of the first fluid $F_1$ moving along the first sheet 106.

The first sheet 106 may be thermally stable, chemically stable, or a combination thereof, in the presence of the first fluid $F_1$ moving along the first sheet 106 and in the presence of the one or more chemically active materials of the porous structure 102. For example, the physicochemical properties of the first sheet 106 may remain substantially unchanged as the first fluid $F_1$ is processed in the porous structure 102. In this manner, the effectiveness of the filter 100 may not limited by degradation of the first sheet 106 under ordinary use. As used in this context, the physicochemical properties of the first sheet 106 may be considered substantially unchanged to the extent that, for example, small changes in one or more physicochemical properties do not change compressive strength of the first sheet 106 alone in a direction perpendicular to the major surface 113 of the first sheet 106. As another non-exclusive example, physicochemical properties of the first sheet 106 may be considered substantially unchanged to the extent that small changes in one or more physicochemical changes do not reduce filtering effectiveness of the porous structure 102. Additionally, or alternatively, as described in greater below, the first sheet 106 may be electrically conductive such that the first sheet 106 may be charged to provide electrical force useful for promoting adsorption and/or reaction of one or more species in the first fluid $F_1$.

Considering for the foregoing performance attributes of the first sheet 106 individually or collectively, it shall be appreciated that the first sheet 106 may include one or more of various different metals (e.g., nickel alloy, stainless steel, or a combination thereof). For example, the first sheet 106 may be a thin sheet of metal, as may be particularly useful in implementations in which the first sheet 106 is nominally flat in the filter 100. Additionally, or alternatively, the first sheet 106 may include metal mixed with one or more other materials, such as a ceramic material, as described in greater detail below.

The second sheet 108, in general, may be a non-permeable interface having a second sheet thickness $t_2$ and arranged relative to the first sheet 106 and the porous structure 102 such that the first sheet thickness $t_1$ of the first sheet 106, the thickness $t_p$ of the porous structure 102 spanning the volume 112, and the second sheet thickness $t_2$ of the second sheet 108 collectively form an overall thickness of the frame 104. Accordingly, mass transfer between the first fluid $F_1$ and the porous structure 102 may occur primarily (e.g., exclusively) via fluid permeability of the first sheet 106. At a minimum, the second sheet 108 may provide mechanical strength to the frame 104 while encapsulating the porous structure 102 in the volume 112 to reduce the likelihood that the one or more chemically active materials of the porous structure 102 may escape the volume 112 during use. As an example, the second sheet thickness $t_2$ of the second sheet 108 may be greater than about 50 microns and less than about 2 mm and may include one or more dense (e.g., non-perforated) materials. Although greater or lesser thicknesses may be used.

In some instances, the second sheet 108 may additionally provide a heat transfer interface to facilitate controlling temperature of the porous structure 102 such that mass transfer and heat transfer in the porous structure 102 may be controlled independently. In this context, controlling temperature of the porous structure 102 shall be understood to include any manner and form of heating and/or cooling the porous structure 102, as may be useful to promote activity of the one or more chemically active materials or reduce the likelihood of degradation or damage to the porous structure 102. For example, controlling temperature of the porous structure 102 via heat transfer through the second sheet 108 may include flowing the second fluid $F_2$ (e.g., through forced or natural convection) along the second sheet 108 to cool or heat the porous structure 102 in situ in the volume 112, as necessary or desirable.

Continuing with the foregoing example, the second sheet 108 may include one or more materials having high thermal conductivity to facilitate heat transfer from the second fluid $F_2$ to the porous structure 102 via the second sheet 108. For example, the second sheet 108 may comprise one of stainless steel, nickel alloy, carbon fiber composite, or a combination thereof. Other suitable materials are within the contemplated scope of disclosure. In this context, high thermal conductivity shall be understood to include thermal conductivity greater than about 10 W/m·K. In certain implementations, the second fluid $F_2$ may be controlled to a constant temperature to facilitate maintaining the porous structure 102 at or near such constant temperature (e.g., delivering heat to the porous structure 102 in instances in which the one or more chemically active materials generate heat or removing heat from the porous structure 102 in instances in which the one or more chemically active materials require heat for chemical activity with a given species). In some embodiments, the second fluid $F_2$ may further, or instead, be varied between hot and cold to facilitate regenerating the one or more chemically active materials of the porous structure 102. Further, or instead, the thermal conductivity of the second sheet 108 may be substantially uniform such that flowing the second fluid $F_2$ along the second sheet 108 may result in corresponding, substantially uniform heating or cooling of the porous structure 102 along an interface between the porous structure 102 and the second sheet 108. For example, in this context, substantially uniform heating or cooling may include a temperature distribution along the interface between the porous structure 102 and the second sheet 108 that is without temperature gradients that damage or otherwise degrade performance of the one or more chemically active materials of the porous structure 102.

In general, the seal 110 may be a fluid nonpermeable material that holds the first sheet 106 and the second sheet 108 in respective fixed positions relative to one another (e.g., parallel to one another) and to the porous structure 102 in the volume 112. In particular, the seal 110 may extend about a perimeter of the porous structure 102 such that, while the porous structure 102 itself may have many surfaces through which mass transfer and/or heat transfer may occur, the seal 110 may block mass transfer and heat transfer from one or more surfaces of the porous structure 102. For example, the seal 110 may extend about a perimeter of the porous structure 102 to leave only the respective interfaces between the porous structure 102 and each of the first sheet 106 and the second sheet 108 as available paths for mass transfer and/or heat transfer with the porous structure 102. Stated differently, the seal 110 may reduce the likelihood of unintended paths of mass transfer and/or heat transfer with the porous structure 102 which, in turn, may facilitate achieving, among other things, consistent and controllable performance of the filter 100 used to process the first fluid $F_1$.

In some implementations, the seal 110 may be releasably coupled to one or both of the first sheet 106 or the second sheet 108. Such releasable coupling may, for example, be useful for providing access to the porous structure 102 to facilitate periodically replacing the porous structure 102 or exposing the porous structure 102 to regenerating conditions away from the frame 104, such as when effectiveness of the one or more chemically active materials of the porous structure 102 fall below a threshold or according to a maintenance schedule. Further, or instead, the releasable coupling between the seal 110 and one or both of the first sheet 106 and the second sheet 108 may be useful for replacing one or both of the first sheet 106 or the second sheet 108, as the case may be, in the event of damage or degradation over time. While the seal 110 may be releasably coupled to one or both of the first sheet 106 or the second sheet 108 according to any one or more of various different techniques, the releasable coupling between the seal 110 and one or both of the first sheet 106 or the second sheet 108 may include a magnetic coupling. For example, in embodiments in which the first sheet 106 or the second sheet 108 includes a magnetic material such as nickel alloy, the seal 110 may include one or more materials magnetically attracted to the first sheet 106 or the second sheet 108 as the case may be. Advantageously, such magnetic coupling may be useful for removing one or both of the first sheet 106 or the second sheet 108 without the use of a tool. Other suitable magnetic materials and materials that may magnetically couple to those magnetic materials are within the contemplated scope of disclosure.

Having described various aspects of individual elements of the filter 100, attention is turned now to relative sizing of certain elements of the filter 100 that may be particularly useful for providing high fluid processing productivity. For example, as described above, the filter 100 may include a high interface area-to-volume ratio of the porous structure 102. Similarly the volume 112 may also include a high interface area-to-volume ratio. A high interface area-to-volume ratio of the porous structure 102 may be characterized as a porous structure 102 having a length L1 to thickness $t_p$ ratio of greater than about 5. Further, or instead, high fluid processing productivity of the filter 100 may be facilitated by relative thickness dimensions in which the thickness $t_p$ of the porous structure 102 is greater than about 50 percent of the overall thickness of the frame 104. This relative distribution of thickness of the frame 104 corresponds to the porous structure 102 being the dominant (e.g., rate limiting) structure of the filter 100 with respect to mass transfer and/or heat transfer. For example, in embodiment in which the thickness $t_p$ of the porous structure 102 is greater than about 50 percent of the overall thickness of the frame 100 and the first sheet 106 and the second sheet 108 have high thermal conductivity, it may be appreciated that the thermal resistance of the filter 100 is approximately that of the porous structure 102. Thus, continuing with this example, the second sheet 108 may facilitate nearly instantaneous heat exchange between the second fluid $F_2$ and the porous structure 102 to reduce the likelihood of inadvertent temperature excursions that may impact performance of the one or more chemically active materials in the porous structure 102.

Having described various aspects of the filter 100, attention is directed now to describing exemplary fabrication techniques, exemplary arrangements of multiple filters, as well as additional or alternative implementations of filters. For the sake of clear and efficient description, elements having numbers having the same last two digits shall be should be understood to be analogous to or interchangeable with one another, unless otherwise explicitly made clear from the context and, therefore, are not described separately from one another, except to note difference or emphasize certain features. Thus, for example, the first sheet 106 (FIGS. 1A-1C) shall be understood to be analogous to the first sheet 206 (FIGS. 2B and 2C), and the second sheet 108 (FIGS. 1A-1C) shall be understood to be analogous to the second sheet 208 (FIGS. 2B and 2C).

Figures 2A, 2B, 2C:
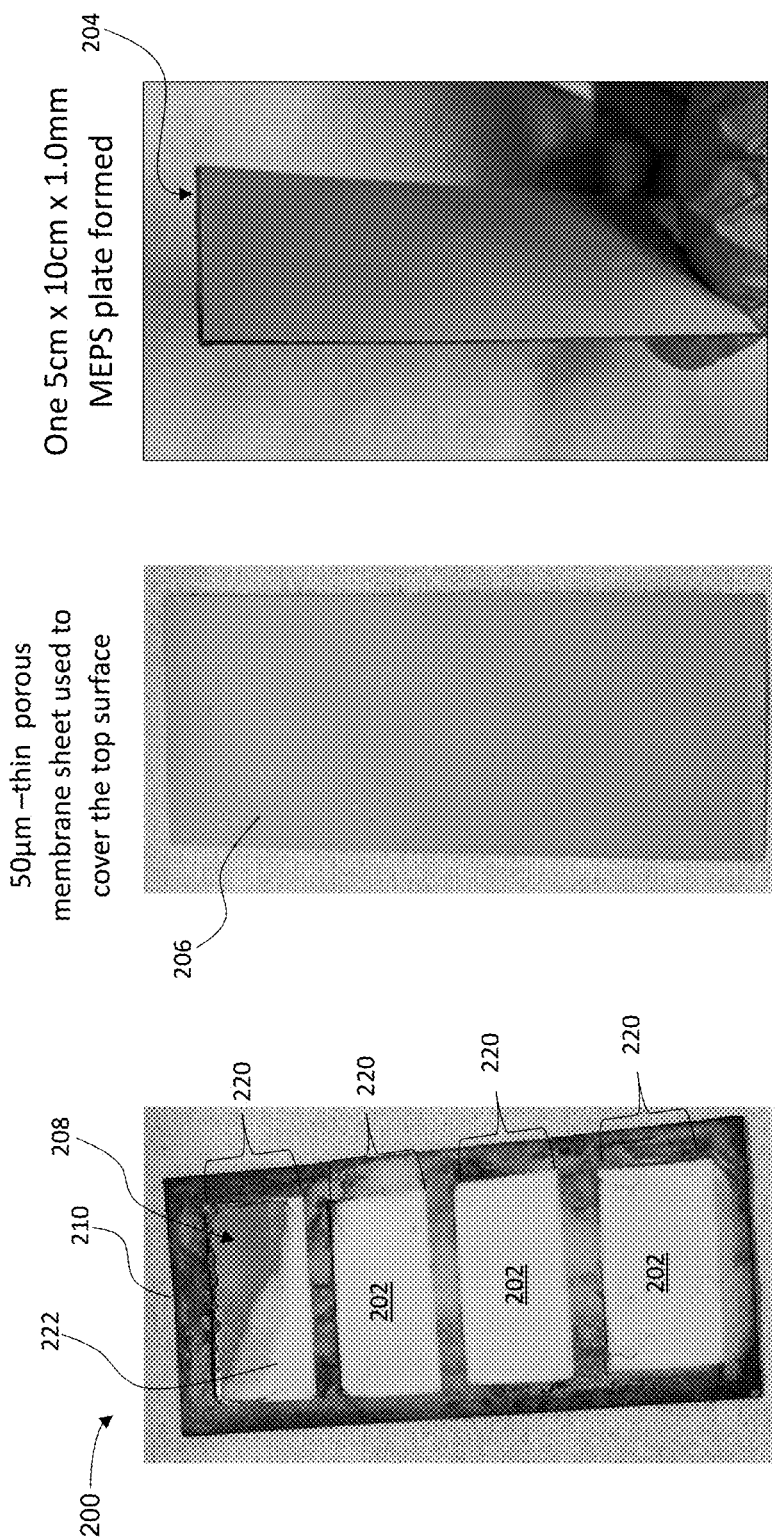
FIGS. 2A-2C are, collectively, a schematic representation of a method of fabricating a filter for processing fluid.

FIGS. 2A-2C show an exemplary method of fabricating a filter for processing fluid. Unless otherwise specified or made clear from the context, the exemplary method shown in FIGS. 2A-2C shall be understood to be applicable to forming any one or more of the various different filters described herein and, thus, shall be generally understood to be applicable to the fabrication of the filter 100 (FIGS. 1A-1C).

Referring now to FIG. 2A, a seal 210 may be placed on a second sheet 208. A thin layer of adhesive (not shown), such as an RTV adhesive, may be applied on the edge of the second sheet 208 to facilitate maintaining the seal 210 in place on the second sheet 208 during fabrication. In certain implementations, the seal 210 may be pressed onto the second sheet 208 to promote adhesion of the seal 210 to the second sheet 208. The seal 210 positioned on the second sheet 208 may define at least one cavity 220 (e.g., four cavities as shown in the example in FIG. 2A).

One or more chemically active materials 222 may be introduced into each instance of the cavity 220 to a thickness about equal to a height of the respective instance of the cavity, and a porous structure 202 including the one or more chemically active materials 222 may be formed. In some embodiments, the one or more chemically active materials 222 may include a powder that is poured into each instance of the cavity 220 and leveled at the height of the seal 210 such that the porous structure 202 including the one or more chemically active materials 222 is formed before each instance of the cavity 220 is covered. The particle packing of the one or more chemically active materials 222 may be shaken and pressed to form the porous structure 202 with a dense packing. Particles or agglomerates of the one or more chemically active materials 222 of sizes larger than $\frac{1}{5}$ of the thickness of the porous structure to be formed should be removed.

While some types of chemically active materials may be procurable in powder form that is readily handled, this is not necessarily the case for certain types of chemically active materials that may be useful for reducing a species from a flow of fluid. In such embodiments, as compared to a powder form, the one or more chemically active materials 222 may be distributed in a solvent or water to form a slurry that may be more easily introduced (e.g., flowed or pasted) into each instance of the cavity 220. In such embodiments, the porous structure 202 including the one or more chemically active materials 222 may be formed after each instance of the cavity 220 is covered, such as by heating the final assembly to evaporate the water or solvent used to facilitate introduction of the one or more chemically active materials 222 into each instance of the cavity.

In certain instances, a binder may be added to the slurry provide physical and/or chemical containment of fine particles of the one or more chemically active materials 222 at scale of the packing layer thickness, much smaller than the length or width of the seal 210. Binders that may be added to the slurry of the one or more chemically active materials 222 include any one or more of inorganic binders, organic binders, or composite binders. In general, acceptable binder materials for any given application are those that are compatible with the one or more chemically active materials 222 with few if any negative impacts (e.g., blocking micropores of particles or inhibiting active sites) on the one or more chemically active materials 222. As an example, zeolite growth gel may be used as a binder of zeolite powder so that the gel may facilitate inter-crystal growth of the zeolite crystals under curing conditions used to form the porous structure 202. As another example, in instances in which the one or more chemically active materials 222 include high surface area carbon particles and these particles are packed in each instance of the cavity 220 under an electrical field, electrical conducting materials such as carbon fiber and nanocarbon tubes may be used as a binder. As yet another example, in instances in which the one or more chemically active materials 222 include alumina-supported catalyst particles, alumina sol may be used as a binder. Further, or instead, polymers may be used as a binder for low temperature applications, and the binder may be cross-linked during a curing process. As a specific example, in instances in which the one or more chemically active materials 222 include amine-based $CO_2$ adsorbent particles, polyamines may be used as a binder. Once the water or solvent is removed, the binder should form a small volume fraction (e.g., greater than 0 and less than about 0.2) of the porous structure 202.

With the one or more chemically active materials 222 disposed in each instance of the cavity 220 (e.g., in the form of the porous structure 202 or in the form of the one or more chemically active materials 222 dispersed in a binder), a first sheet 206 may be positioned to cover each instance of the cavity 220 such that the first sheet 206, the second sheet 208, and the seal 210 collectively form a frame 204 defining a volume (e.g., the volume 112 of FIGS. 1A-1C) spanned by the porous structure 202. The volume, and thus the porous structure 202, may be thin such that a thickness of the porous structure 202 between the first sheet 206 and the second sheet 208 is less than any other dimension of the porous structure 202.

Figure 3B:
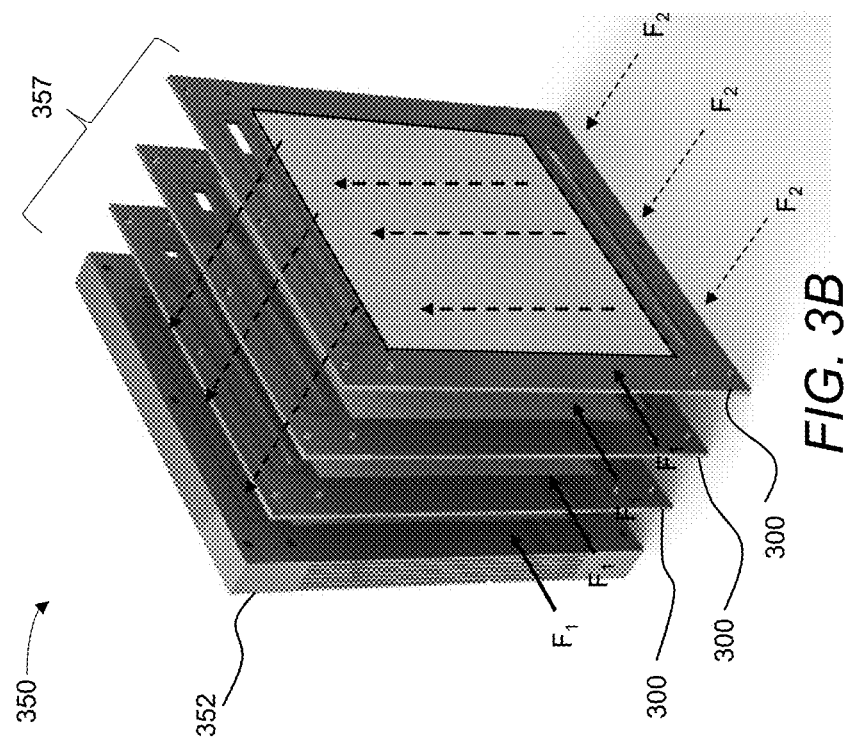
FIG. 3B is an exploded view of the system of FIG. 3A, shown with channel spacers removed.
Figure 3A:
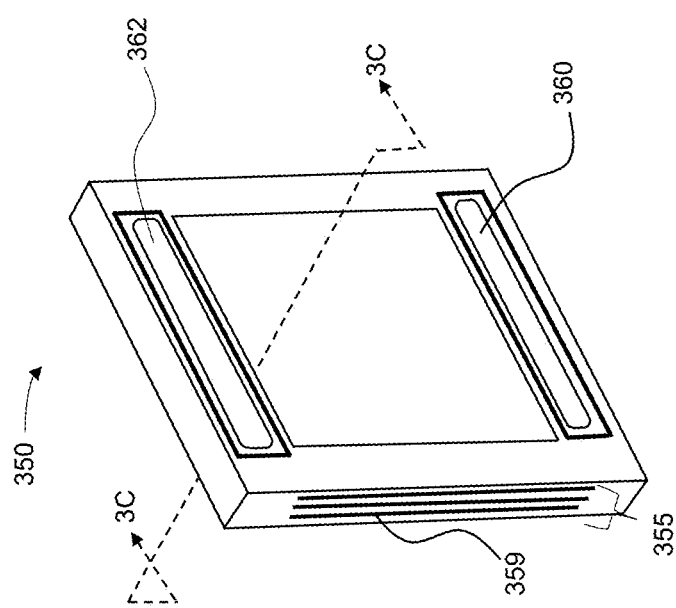
FIG. 3A is a perspective view of a system including a plurality of filters supported on a chassis.
Figure 3C:
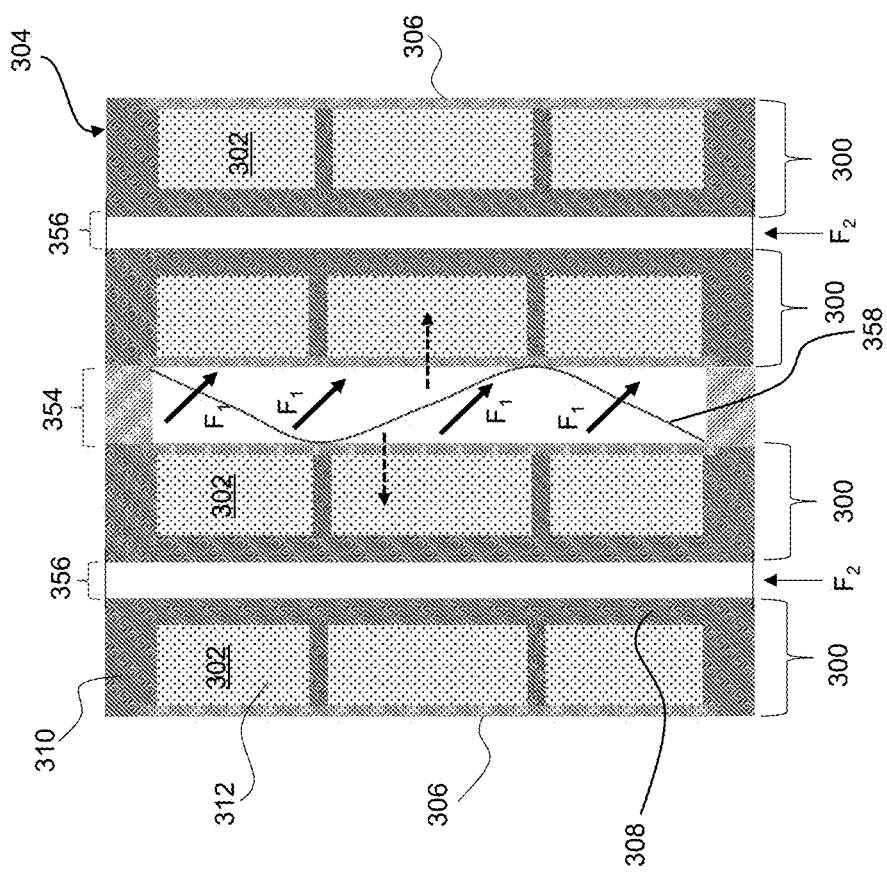
FIG. 3C is a side view of a partial cross-section of the system of FIG. 3A, the partial cross-section taken along the cross-section 3C-3C in FIG. 3A.
Figure 4:
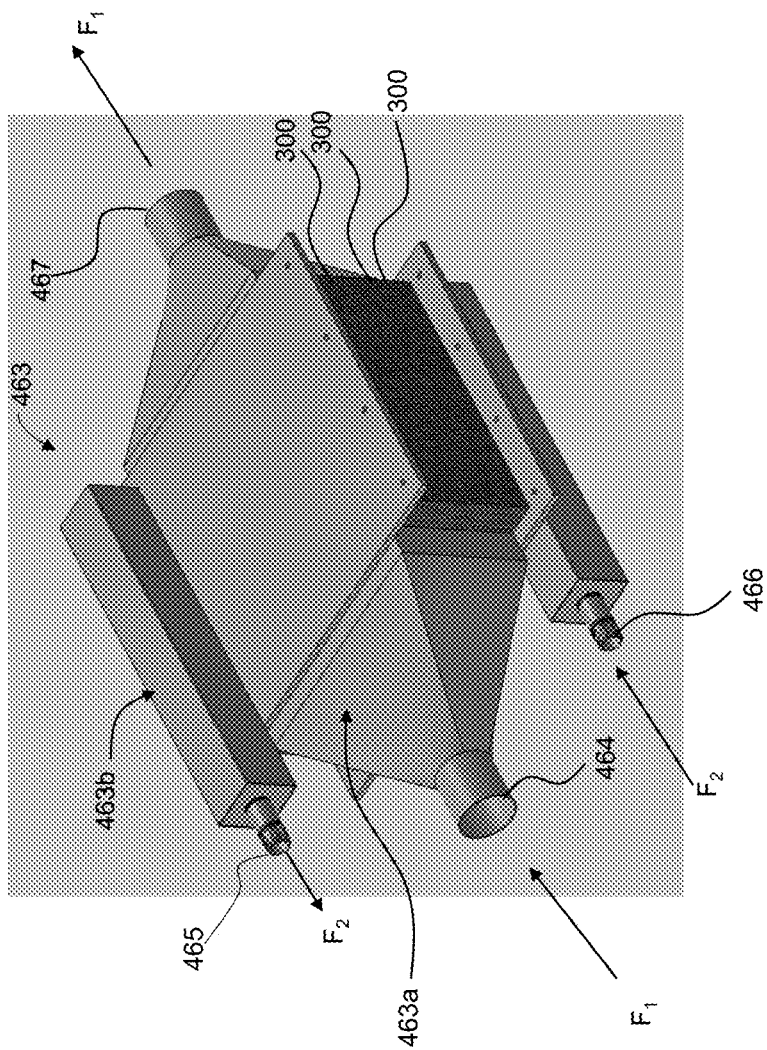
FIG. 4 is a perspective view of a manifold positioned about the plurality of filters and chassis of FIG. 3A to direct a first fluid and a second fluid through the chassis and along the plurality of filters.

Referring now to FIGS. 3A-3C, a system 350 for processing fluid may include a plurality of filters 300 and a chassis 352. Each one of the plurality filters 300 may include a porous structure 302 and a frame 304. The frame 304 may include a first sheet 306, a second sheet 308, and a seal 310 collectively defining a volume 312 spanned by the porous structure 302. The plurality of filters 300 may be supported by the chassis 352 in an orientation parallel to one another to enhance processing throughput, as compared to a single filter. In particular, the plurality of filters 300 may be supported by the chassis 352 with the first sheet 306 of each instance of the filter 300 forming a portion of a first channel 354 and the second sheet 308 of each instance of the filter 300 forming a portion of a second channel 356. That is, collectively, the plurality of filters 300 are spaced apart from one another such that the plurality of instances of the first sheet 306 define a plurality of instances of the first channel 354, and the plurality of instances of the second sheet 308 define a plurality of instances of the second channel 356.

The first sheet 306 of each filter 300 may be fluid permeable and the second sheet 308 of each filter 300 may be fluid nonpermeable. Thus, it shall be appreciated that mass transfer occurs in the plurality of instances of the first channel 354 while heat transfer is controlled in the plurality of instances of the second channel 356. The pressure drop decreases with increasing channel spacing, while the mass and heat transfer rates from the bulk flow of the first fluid $F_1$ to the porous structure 302 and the bulk flow of the second fluid $F_2$ to the porous structure 302, respectively, increase with decreasing channel spacing. Accordingly, to achieve high productivity (e.g., high mass and heat transfer rates) while considering operating and capital costs (e.g., the cost of pumping to overcome pressure drop), the channel spacing of the first channel 354 and the second channel 356 may be greater than about 0.3 and less than about 5 mm (e.g., greater than about 0.5 mm and less than about 3 mm).

The chassis 352 may define an intake region 355 and an outlet region 357 in fluid communication with one another via the plurality of instances of the first channel 354. Thus, in use, the first fluid $F_1$ may flow into the chassis 352 via the intake region 355 and into the plurality of instances of the first channel 354. As the first fluid $F_1$ exits the plurality of instances of the first channel 354, the first fluid $F_1$ may exit the chassis 352 via the outlet region 357. In general, the intake region 355 may include any one or more of various different arrangements suitable for receiving a main flow of the first fluid $F_1$ into the chassis 352 and distributing this main flow substantially equally (e.g., varying by less than about ±20 percent from one another) among the plurality of instances of the first channel 354. Similarly, the outlet region 357 may include any one or more of various different arrangements suitable or collecting the flow of the first fluid $F_1$ from the plurality of instances of the first channel 354 and directing the flow of the first fluid $F_1$ out of the chassis 352. As an example, the intake region 355 may be divided to direct the flow of the first fluid $F_1$ directly into each instance of the first channel 354 and, further or instead, the outlet region 357 may be divided to receive the flow of the first fluid $F_1$ directly from each instance of the first channel 354.

In some embodiments, a first channel spacer 358 may be disposed in each instance of the first channel 354 to attach each instance of the first sheet 306 to the chassis 352 and define an area of contact between the first fluid $F_1$ and each instance of the first sheet 306. The first channel spacer 358 may resist deformation of a given instance of the first channel 354 during use and may increase the likelihood that the dimensions of the first channel 354 remain substantially uniform along the length of the respective instance of the first channel 354. Additionally, or alternatively, the first channel spacer 358 may facilitate achieving approximately equal flow of the first fluid $F_1$ along each instance of the first sheet 306 defining the given instance of the first channel 354, by dividing the flow of the first fluid $F_1$ moving through the given instance of the first channel 354.

The chassis 352 may define an inlet orifice 360 and an outlet orifice 362 for the second fluid $F_2$. The plurality of instances of the second channel 356 may be sealed (e.g., using one or more gaskets between adjacent instances of the filter 300) inside of the chassis 352 such that the plurality of instances of the second channel 356 are in fluid communication with one another and a main flow via the inlet orifice 360 and the outlet orifice 362. Further, the plurality of instances of the second channel 356 are fluidically isolated from the plurality of instances of the first channel 354 such that the first fluid $F_1$ and the second fluid $F_2$ do not mix with one another as each fluid moves through the chassis 352.

For example, a main flow of the second fluid $F_2$ may flow into the chassis 352 via the inlet orifice 360, where the flow of the second fluid $F_2$ may become divided (e.g., substantially evenly such that flow of the second fluid $F_2$ through each instance of the second channel 356 is within ±20 percent of the flow through each other instance of the second channel 356). As the second fluid $F_2$ exits the plurality of instances of the second channel 356, the second fluid $F_2$, the flow of the second fluid $F_2$ moves out of the chassis 352 via the outlet orifice 362. Accordingly, the arrangement of the filters 300 to define the plurality of instances of the second channel 356 facilitates controlling heat transfer to two of the plurality of filters 300 at the same time. As compared to the use of a dedicated channel for the flow of a heat transfer fluid relative to a given filter, the plurality of instances of the second channel 356 provides significant advantages with respect to space savings while also simplifying installation of the system 350.

Referring now to FIGS. 3A-3C and FIG. 4, the system 350 may include a first manifold 463a and a second manifold 463b, which are collectively referred to herein as a manifold 463. The chassis 352 supporting the plurality of instances of the filter 300 may be disposed in the manifold 463 and, in general, the manifold 463 may direct a main flow of the first fluid $F_1$ and a main flow of the second fluid $F_2$ respective portions of the chassis 352 for introduction into the appropriate type of channel for each fluid. Further, the manifold 463 may facilitate keeping the first fluid $F_1$ and the second fluid $F_2$ separate from one another as the first fluid $F_1$ is processed according to any one or more of the various different mass transfer techniques described herein to achieve removal of one or more species, and the second fluid $F_2$ is controlled to achieve target temperature of the porous structure 302 of each filter 300.

The first manifold 463a may, for example, define a first inlet portion 464 and a first outlet portion 467 axially aligned with one another and in fluid communication with one another via the plurality of instances of the first channel 354 defined by the plurality of filters 300 supported by the chassis 352. Further, or instead, the second manifold 463b may define a second inlet portion 466 and a second outlet portion 465 in fluid communication with one another via the plurality of instances of the second channel 356 defined by the plurality of filters 300 supported by the chassis 352.

In general, the first manifold 463a may facilitate efficient direction of the first fluid $F_1$ while the second manifold 463b may facilitate efficient direction of the second fluid $F_2$. That is, stated in terms of pressure drop, the pressure drop through the plurality of instances of the first channel 354 may be a few times greater than the respective pressure drops through the first inlet portion 464 and the first outlet portion 467 of the manifold 463. Further, or instead, the pressure drop through the plurality of instances of the second channel 356 may be a few times greater than the pressure drop associated with moving the second fluid $F_2$ through the inlet orifice 360 and outlet orifice 362 for distribution along the plurality of instances of the second channel 356. Further, the first manifold 463a and the second manifold 463b may advantageously direct the first fluid $F_1$ and the second fluid $F_2$ through respective channels in different directions to one another (e.g., in directions perpendicular to one another), as may be useful for reducing the likelihood nonuniform temperature distribution within each instance of the filter 300.

Figure 5A:
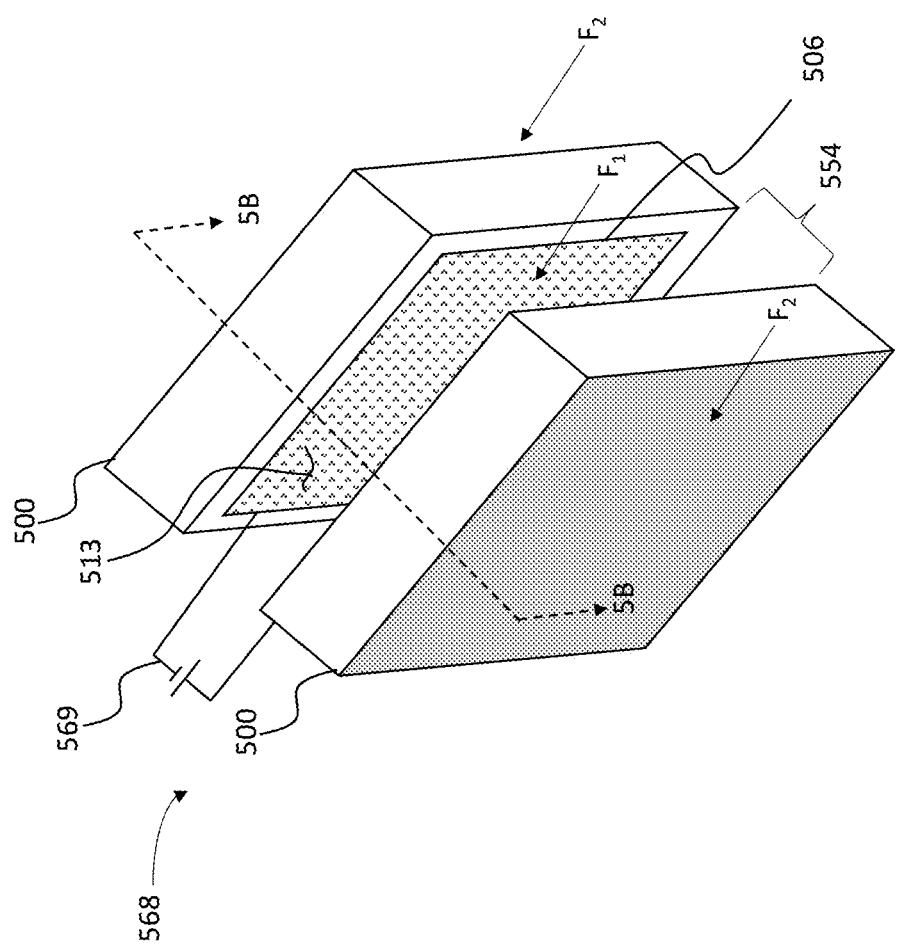
FIG. 5A is a perspective view a system including a first filter, a second filter, and a power source activatable to generate an electric field between the first filter and the second filter.
Figure 5B:
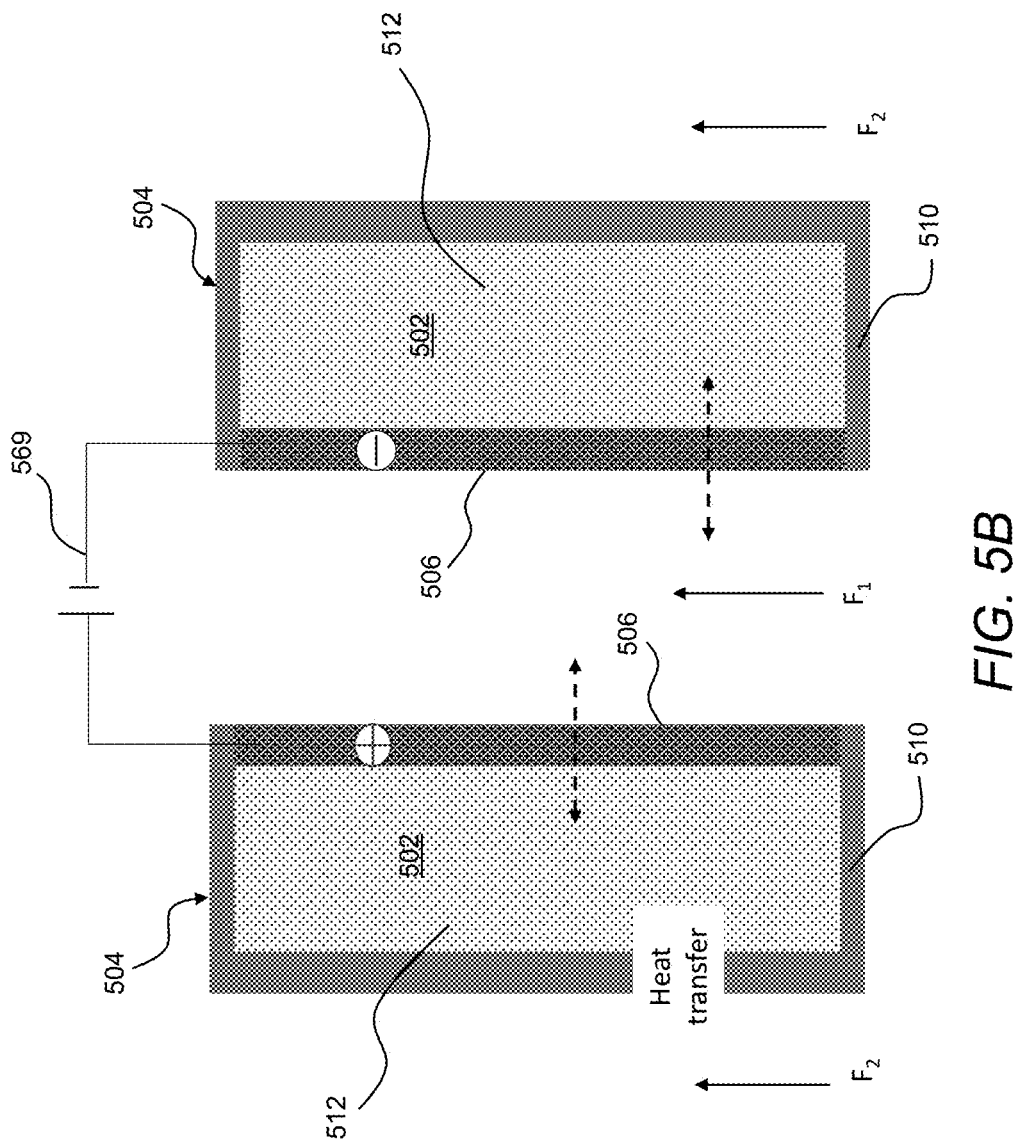
FIG. 5B is a side view of a cross-section of the system of FIG. 5A, the cross-section taken along the cross-section 5B-5B in FIG. 5A.

Referring now to FIGS. 5A and 5B, a system 568 for processing a fluid may include a plurality of filters 500 and a power source 569. The plurality of filters 500 may be spaced apart from one another to define at least one first channel 554 therebetween (e.g., as described above with respect to FIGS. 3A-3C). Each instance of the plurality of filters 500 may include a first sheet 506 that includes one or more materials that are electrically conductive (e.g., one or more metals). More specifically, the first sheet 506 may be an electrically conducting fluid permeable interface that can be used to process the first fluid $F_1$ under an electrical field. The power source 569, therefore, may be electrically coupled to each instance of the filter 500 such that the first sheet 506 of one of the plurality of filters 500 is a cathode and the first sheet 506 of another one of the plurality of filters 500 is an anode.

In use, the power source 569 may be activated to charge the two opposing instances of the first sheet 506 along the first channel 554. As the first fluid $F_1$ moves along the first channel 554, between the charged instances of the first sheet 506, charged molecules and/or particulates (e.g., aerosol particulates, charged particulates in solutions, charged molecules in solutions, or a combination thereof) in the first fluid $F_1$ may be attracted to one or both instances of the first sheet 506 to accumulate on a major surface 513 of the first sheet 506, while certain molecules may diffuse across each instance of the first sheet 506 to adsorb and/or react with one or more chemically active materials of a porous structure (e.g., the porous structure 102 in FIGS. 1A-1C) according to any one or more of the various different techniques described herein. When the major surface 513 of one of the instances of the first sheet 506 becomes saturated, power from the power source 569 to the plurality of filters 500 may be interrupted to facilitate removing the particles and molecules that have accumulated on the major surface 513 (e.g., by being flushed off of the major surface 513 by the first fluid $F_1$). Further or instead, the major surface 513 of one or more instances of the first sheet 506 may be catalyzed such that the charged molecules and/or particulates accumulated on the major surface 513 can be electrochemically reacted for removal. Each filter 500 may include a volume 512, porous structure 502, first sheet 506, frame 504, and seal 510.

While the filters 100, 300, 500 above have been described as having a single fluid permeable interface and an nonpermeable interface, it shall be appreciated that filters 100, 300, 500 may alternatively include two fluid permeable interfaces such that fluid processing may include mass transfer and/or convective flow between a first fluid flowing along one fluid permeable sheet and a second fluid flowing along a second fluid permeable sheet.

Figure 6B:
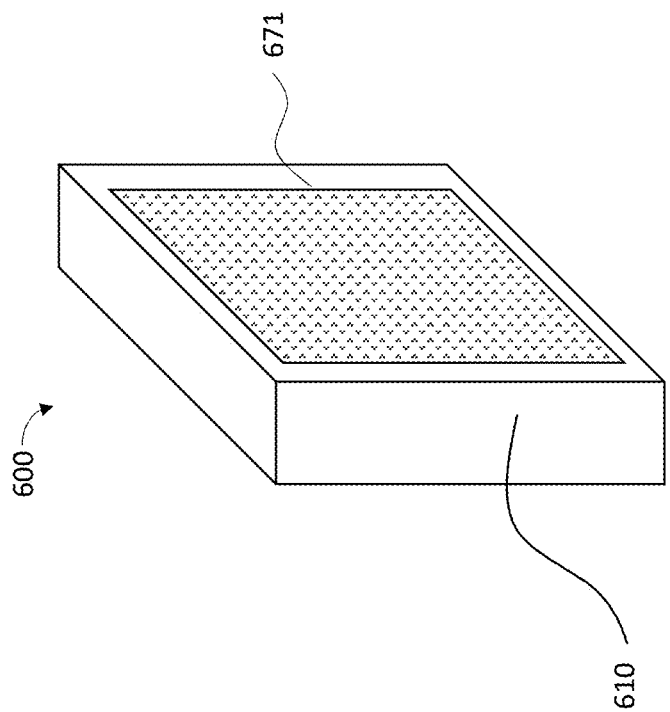
FIG. 6B is a second perspective view of the filter of FIG. 6A along a fluid permeable second sheet.
Figure 6A:
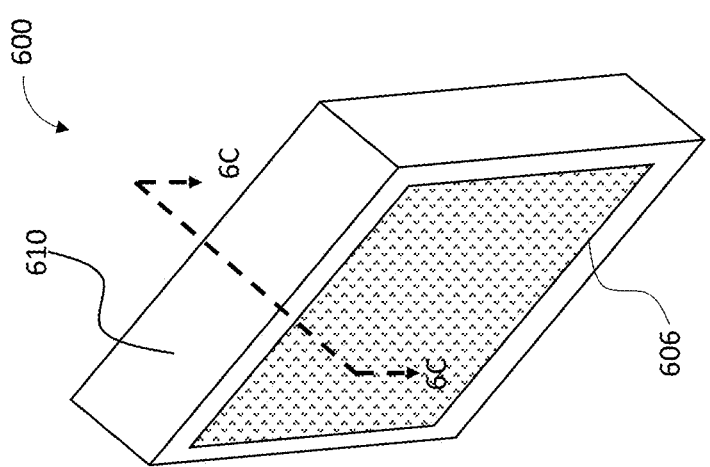
FIG. 6A is a first perspective view of a filter along a fluid permeable first sheet.
Figure 6C:
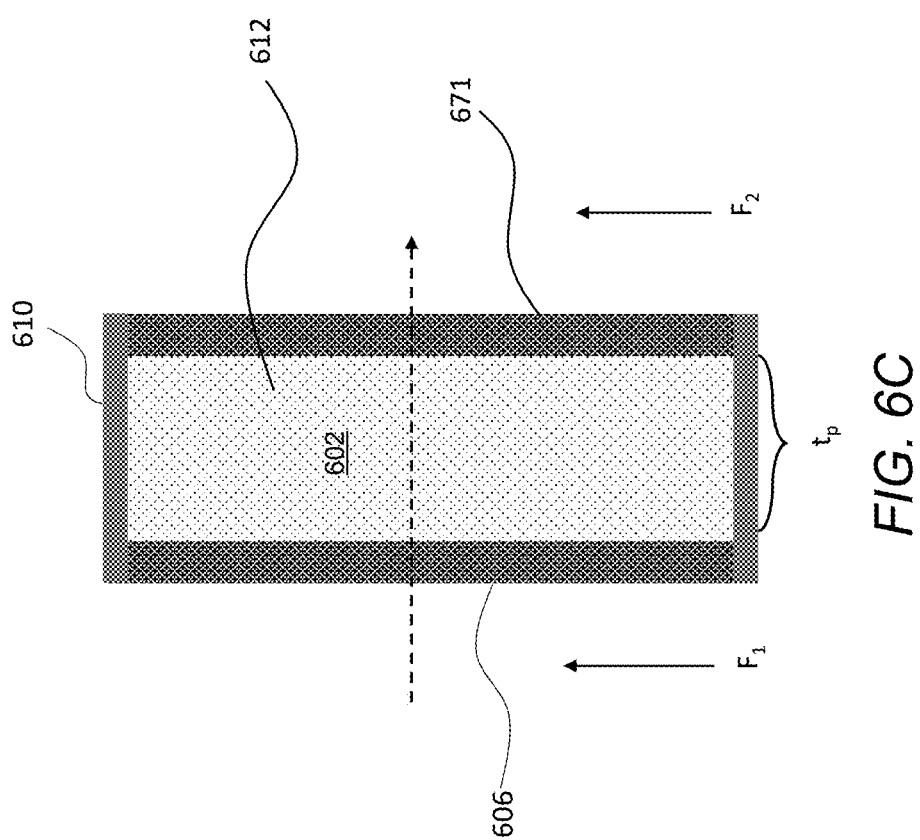
FIG. 6C is a side view of a cross-section of the filter of FIG. 6A, the cross-section taken along 6C-6C in FIG. 6A.

As an example, referring now to FIGS. 6A-6C, a filter 600 may include a porous structure 602 and a frame 604. The porous structure 602 may include any one or more of the different chemically active materials described herein. The frame 604 may include a first sheet 606, a second sheet 671, and a seal 610 collectively defining a volume 612. Each dimension of the volume 612 may be spanned by the porous structure 602 such that there is little or no unreactive volume within the volume 612. The first sheet 606 and the second sheet 671 may each be fluid permeable such that mass transfer and/or convective flow may occur between the first fluid $F_1$ flowing along the first sheet 606 and the second fluid $F_2$ flowing along the second sheet 671. Each of the first sheet 606 and the second sheet 671 may each have large interface areas with the porous structure 602 compared to the volume of the porous structure 602 such that the first fluid $F_1$ flowing through porous structure 602 to facilitate mass transfer between the first fluid $F_1$ and the porous structure 602. For example, all or a fraction of the first fluid $F_1$ may flow from the first sheet 606 to the second sheet 671, via the porous structure 602, and into the second fluid $F_2$ under a pressure gradient. As the first fluid $F_1$ flows through the porous structure 602, certain molecules in the first fluid $F_1$ may adsorb or react with the one or more chemically active materials of the porous structure 602. Particulates in the first fluid $F_1$ may be blocked by the first sheet 606 to prevent penetration of such particulates into the porous structure 602, where such particulates would otherwise interfere with the effectiveness of the one or more chemically active materials. Additionally, or alternatively, it shall be appreciated that first sheet 606 and the second sheet 671 may each have a porosity suitable for retaining particulates possibly generated from the porous structure 602 at the interface between the porous structure 602 and the second sheet 671.

Further, the large interface area between the porous structure 602 and each of the first sheet 606 and the second sheet 671 may be useful for establishing substantially uniform flow distribution of the first fluid $F_1$ through the porous structure 602. As used in this context, substantially uniform flow distribution of flow may include a flow distribution that is in contact with all of the porous structure 602. Such substantially uniform flow distribution of the first fluid $F_1$ may be realized as a result of the pressure drops at the various interfaces encountered by the first fluid $F_1$ moving through the filter 600. More specifically, the pressure drop through the first sheet 606 and the second sheet 671 may be greater than the pressure drop through the porous structure 602. Since pressure drop through the porous structure 602 generally increases with increasing magnitude of the thickness $t_p$ of the porous structure 602, it shall be appreciated that achieving low pressure drop through the porous structure 602 generally favors smaller magnitude of the thickness $t_p$. For example, the thickness $t_p$ of the porous structure 602 may be greater than about 0.1 mm and less than about 100 mm, which is substantially shorter than the thickness of conventional packed beds.

Figure 7:
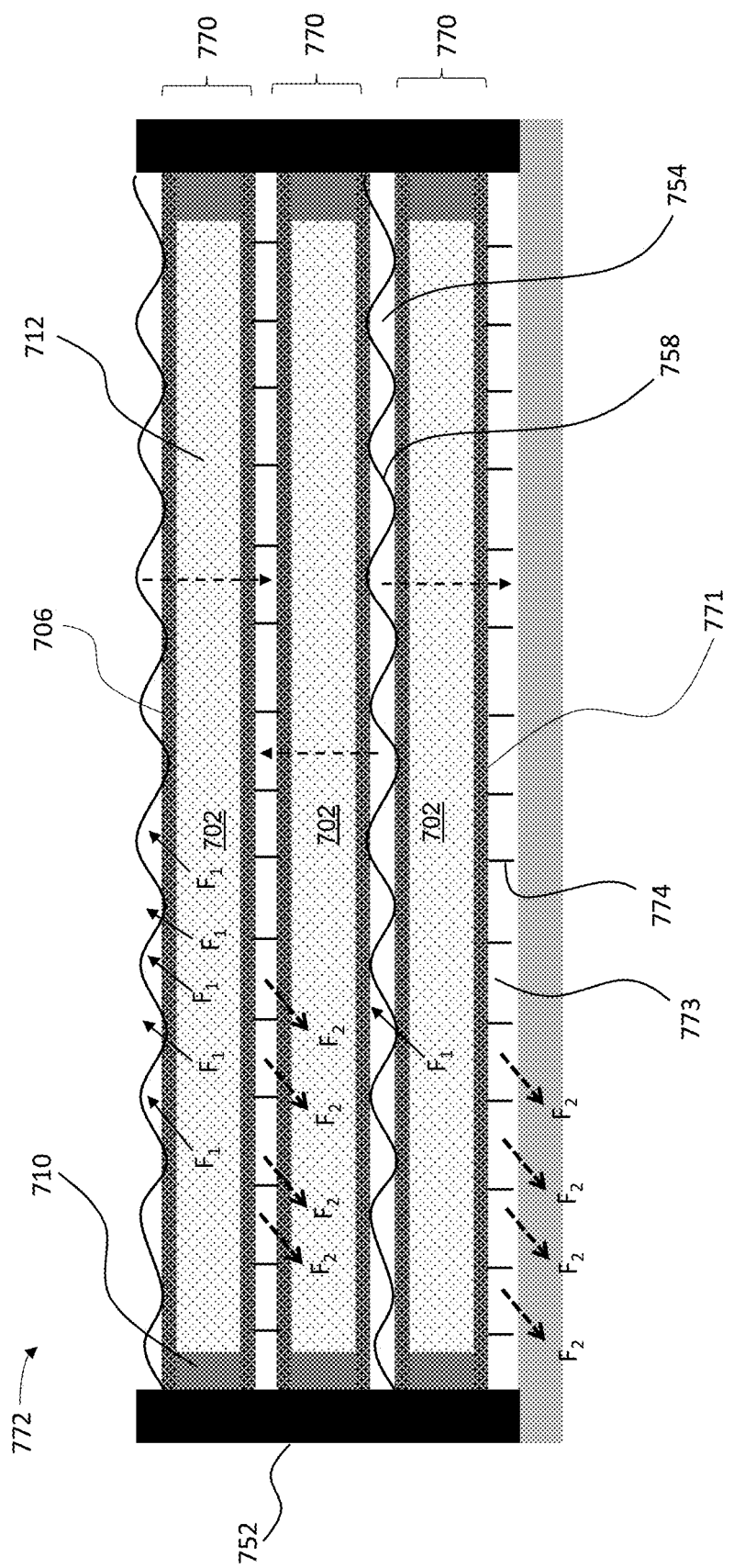
FIG. 7 is a schematic representation of a first fluid and a second fluid through a stack of filters including two fluid permeable sheets.

Referring now to FIG. 7, a system 772 may include a plurality of filters 770 supported on a chassis 752 with spacing between the plurality of filters 770. Each filter 770 may include a porous structure 702 spanning a volume 712 defined by a first sheet 706, a second sheet 771, and a seal 710. The plurality of filters 770 may be positioned on the chassis 752 such that the first sheet 706 of one of the plurality of filters 770 faces the first sheet 706 of another one of the plurality of filters 770 with a space therebetween, and the second sheet 771 of one of the plurality of filters 770 faces the second sheet 771 of another one of the plurality of filters 770 with a space therebetween. That is, collectively, the plurality of filters 770 include a plurality of instances of the first sheet 706 defining a plurality of first channels 754 and a plurality of instances of the second sheet 771 defining a plurality of second channels 773. Such stacking may facilitate the efficient use of space to process a large amount of the first fluid $F_1$ in a processing environment.

The spacing of each of the plurality of first channels 754 and each of the plurality of second channels 773 may be greater than about 0.3 mm and less than about 5 mm (e.g., greater than about 0.5 mm and less than about 3 mm). In certain implementations, a first channel spacer 758 may be disposed in each of the plurality of first channels 754, and a second channel spacer 774 may be disposed in each of the plurality of second channels 773 to facilitate maintaining such spacing along the length of each channel. Further, or instead, the first channel spacer 758 and/or the second channel spacer 774 may be useful for connecting one or more of the plurality of filters 770 to the chassis 752.

Figure 8B:
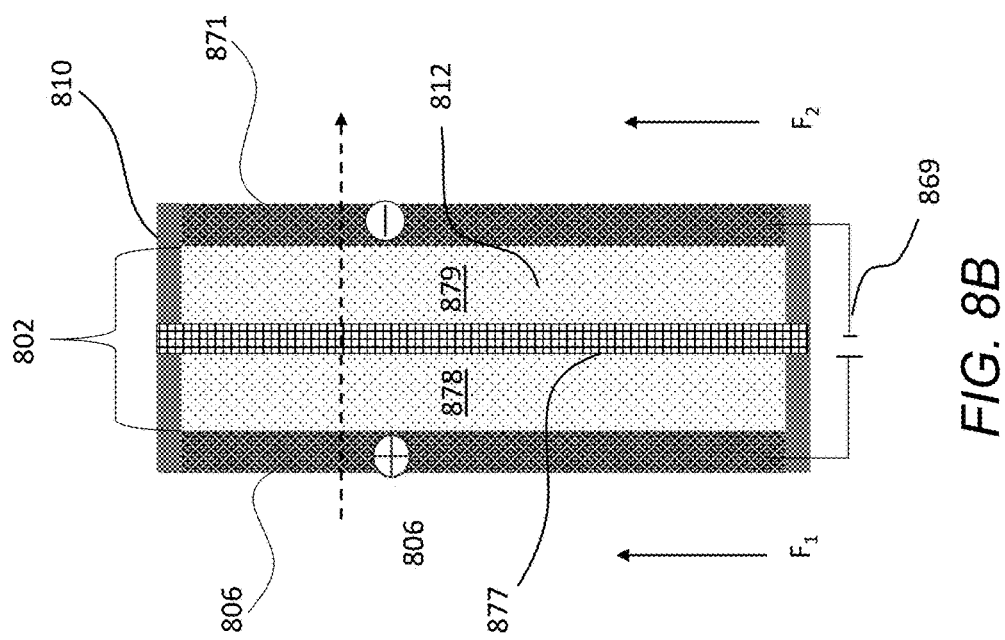
FIG. 8B is a side cross-sectional view of the filter of FIG. 8A, the cross-section taken along the cross-section 8B-8B in FIG. 8A.
Figure 8A:
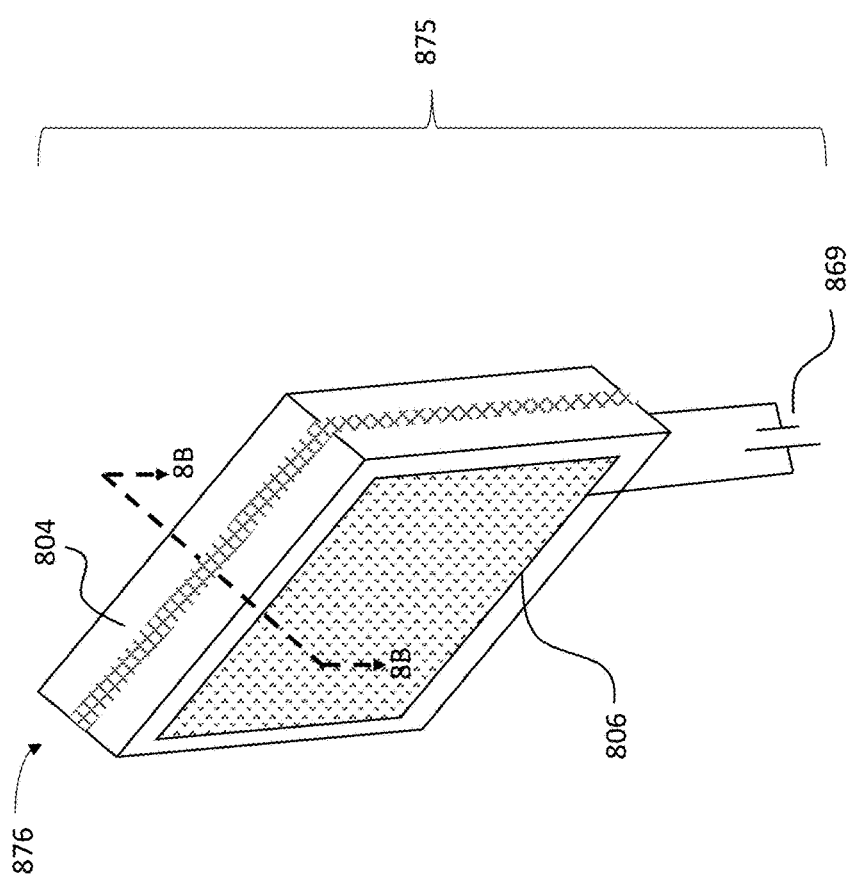
FIG. 8A is a perspective view of a filter including a separator.

Referring now to FIGS. 8A and 8B, a system 875 for processing a fluid may include a filter 876 and a power source 869. The filter 876 may include a porous structure 802 and a frame 804. The porous structure 802 may include a partition 877 separating a first portion 878 of the porous structure 802 from a second portion 879 of the porous structure 802. The frame 804 may include a first sheet 806, a second sheet 871, and a seal 810 collectively defining a volume 812, and the porous structure 802 spans each dimension of the volume 812.

The partition 877 may be any one or more of various different materials that are at least fluid permeable to permit the first fluid $F_1$ flowing along the first sheet 806 to flow, under a pressure gradient, through the filter 876 and into the second fluid $F_2$ flowing along the second sheet 871. That is, the first fluid $F_1$ may flow through the first sheet 806 and the second sheet 871 via the first portion 878 of the porous structure 802, the partition 877, and the second portion 879 of the porous structure 802. Given that it may be generally desirable to have a low pressure drop through the porous structure 802, it may be useful to form the partition 877 as thin as possible while providing suitable electrical isolation between the first portion 878 and the second portion 879 of the porous structure 802.

In certain embodiments, the partition 877 may be a fluid permeable material that is also electrically insulating (e.g., one or more of porous ceramic sheets, polymeric membranes, composite membranes, or a combination thereof) such that the partition 877 electrically isolates the first portion 878 and the second portion 879 of the porous structure 802 from one another while permitting the first fluid $F_1$ to flow from the partition 877 as described above. In such implementations, the first sheet 806 and the second sheet 871 may each include one or more electrically conductive materials electrically coupled to the power source 869 such that the first sheet 806 and the second sheet 871 are oppositely charged electrodes. As the first fluid $F_1$ flows through the first sheet 806 and the second sheet 871, negatively charged particulates and/or molecules may be retained by the positively charged first sheet 806 and/or the first portion of the porous structure 878, while the positively charged particulates and/or molecules may be retained by the negatively charged second sheet 871 and/or the second portion of the porous structure 879. Once the charging attraction capacity is saturated, the power source 869 can remove the electrical charge and the previously retained particulates and molecules can be washed out.

In some embodiments, the one or more chemically active materials of the porous structure 802 may include electrically conducting materials of high specific surface area (e.g., carbon, activated carbon, carbon fibers, nano carbon fibers, carbon nanotubes, or combinations thereof). Such conducting materials in the first portion 878 of the porous structure 802 may be charged by the first sheet 806 to increase attraction capacity of the first sheet 806 when the first sheet 806 is electrically charged by the power source 869. Further, or instead, such conducting materials in the second portion 879 of the porous structure 802 may be charged by the second sheet 871 to increase attraction capacity of the second sheet 871 when the second sheet 871 is electrically charged by the power source 869. As an example, the system 875 including electrically conducting materials in the porous structure 802 may be used for treatment and purification of water. Continuing with this example, the first fluid $F_1$ is raw water that flows through the filter 876 into the second fluid $F_2$. The power source 869 provides opposite charge to first sheet 806 and the second sheet 871 such that the particulates and bacteria in the raw water are blocked by the first sheet 806. The cations are attracted on the negatively-charged carbon of the porous structure 802, and the anions are attracted on the positively-charged carbon of the porous structure 802. Molecules without charging (e.g., hydrocarbons) can adsorb on the carbon. Accordingly, as may be appreciated from the foregoing example, various impurities (e.g., one or more of particulates, bacteria, virus, salts, hydrocarbon molecules, or combinations thereof) in the water may be removed by a single instance of the filter 876

In certain embodiment, one or both of the first sheet 806 or the second sheet 871 may include a catalytic material and the electrical charge may be used to carry out an electrochemical reaction. For example, electrooxidation can be conducted on the positive electrode. Additionally, or alternatively, electroreduction can be conducted on the negative electrode.

Figure 9A:
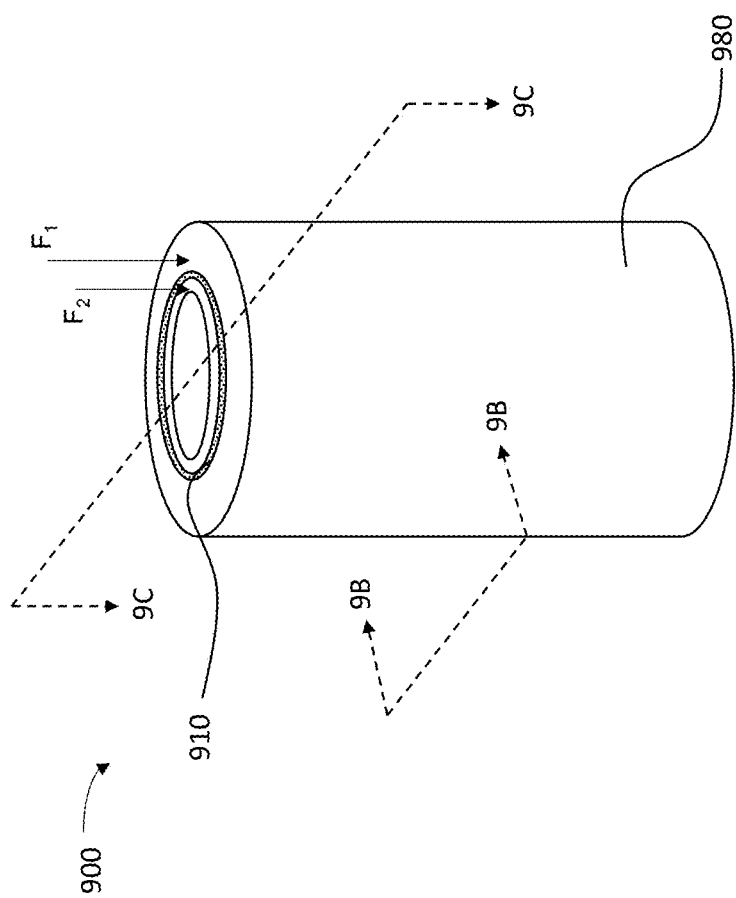
FIG. 9A is a perspective view of a cylindrical filter.
Figure 9C:
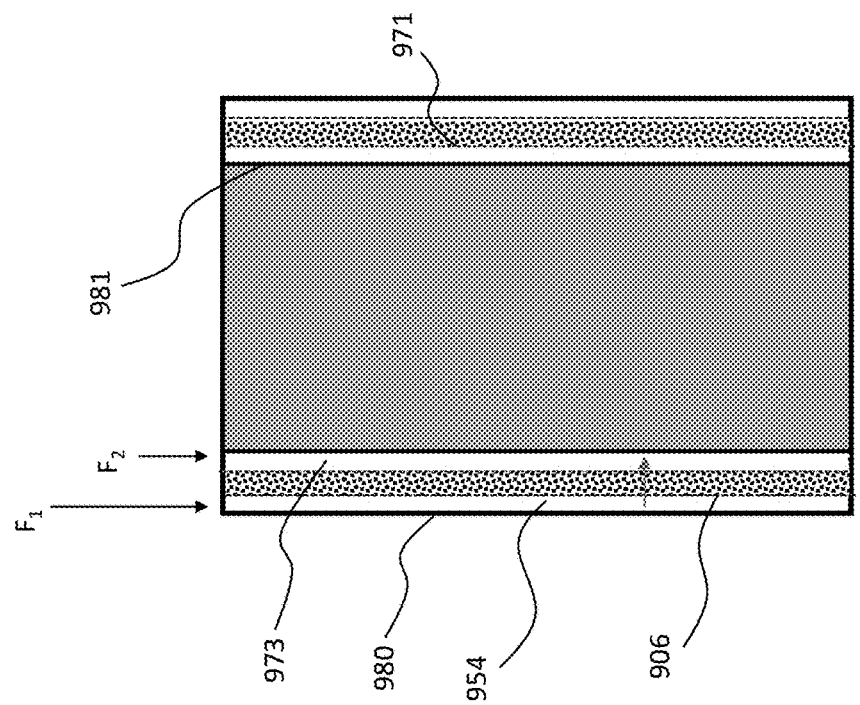
FIG. 9C is a side view of a cross-section of the cylindrical filter of FIG. 10A, the cross-section taken along 9C-9C in FIG. 9A.
Figure 9B:
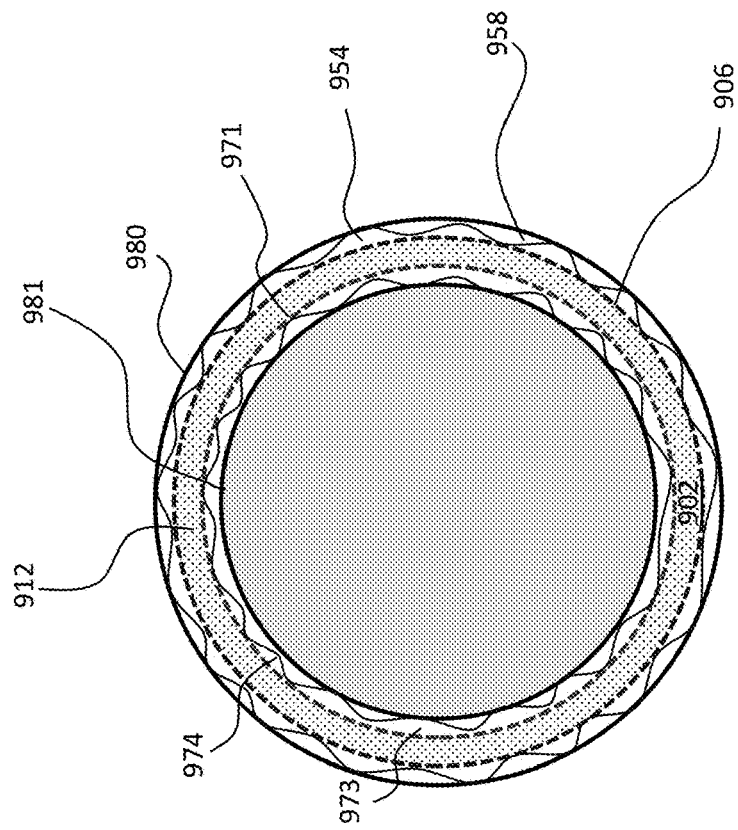
FIG. 9B is a top view of a cross-section of the cylindrical filter of FIG. 9A, the cross-section taken along 9B-9B in FIG. 9A.

While filters 100, 300, 500, 600, 770, 876 have been described herein as having planar orientations, other filter shapes are additionally or alternatively possible. For example, referring now to FIGS. 9A-9C, a filter 900 may include a porous structure 902, a first sheet 906, a seal 910, and a second sheet 971. The first sheet 906 may be a first cylinder, and the second sheet 971 may be a second cylinder axially aligned with the first cylinder and having an outer diameter that is smaller than an inner diameter of the first cylinder such that the first cylinder and the second cylinder define an annulus therebetween. The volume 912 may, therefore, be an annular region defined by the first sheet 906, the second sheet 971, and the seal 910 extending across the top and the bottom of the first sheet 906 and the second sheet 971. The porous structure 902 may be annular and sized to span each dimension of the volume 912. While the second sheet 971 is described as having an outer diameter that is smaller than an inner diameter of the first sheet 906, it shall be appreciated that the second sheet 971 may form the larger of the two cylinders in some instances.

The filter 900 may, for example, include an outer wall 980 and an inner wall 981. The outer wall 980 may be nonpermeable and in the form of a cylinder axially aligned with the first sheet 906 and having an inner diameter greater than an outer diameter of the first sheet 906 such that an annular region between the outer wall 980 and the first sheet 906 defines a first channel 954. The inner wall 981 may be a cylinder axially aligned with the second sheet 971 and having an outer diameter less than an inner diameter of the second sheet 971. Accordingly, an annular region between the inner wall 981 and the second sheet 971 may define a second channel 973. Further, or instead, a first channel spacer 958 may be disposed in the first channel 954, and a second channel spacer 974 may be disposed in the second channel 973.

In use, a bulk flow of the first fluid $F_1$ may flow along the first channel 954, and a bulk flow of the second fluid $F_2$ may flow along the second channel 973. Under a pressure gradient, at least a portion of the first fluid $F_1$ may flow from the first sheet 906 to the second sheet 971, via the porous structure 902, such that any one or more of the various different mass transfer techniques described herein may remove at least one species from the first fluid $F_1$. The first fluid $F_1$ flowing through the second sheet 971 ultimately combines with the bulk flow of the second fluid $F_2$ in the second channel 973.

Figure 10A:
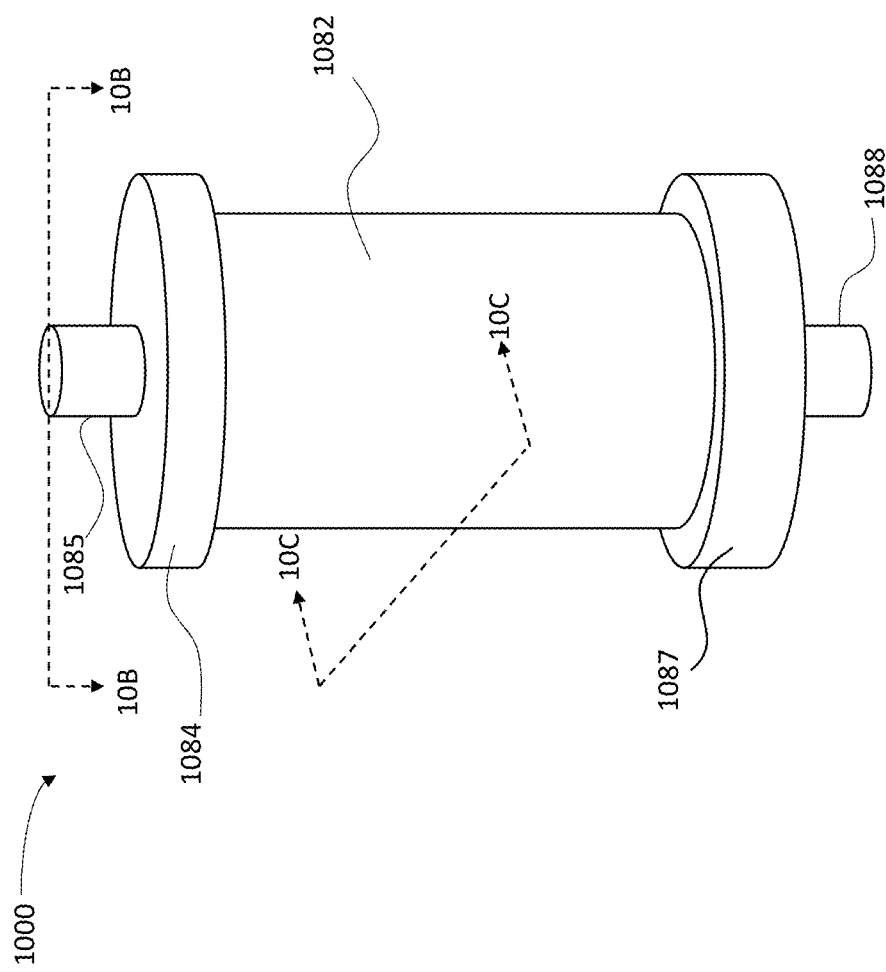
FIG. 10A is a perspective view of a cartridge filter.
Figure 10C:
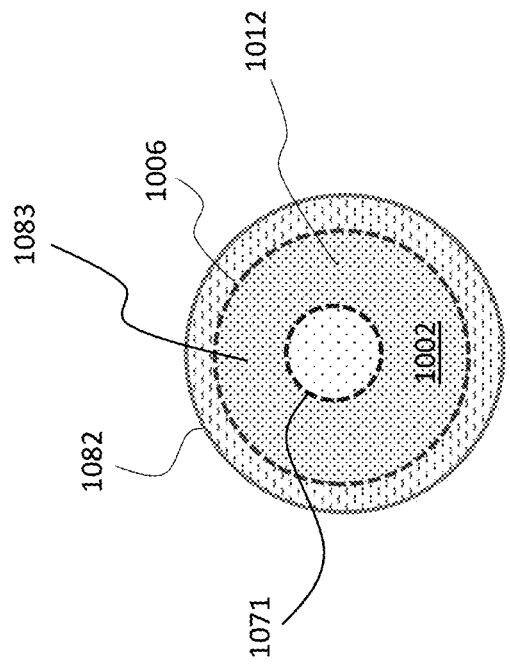
FIG. 10C is a top view of a cross-section of the cartridge filter of FIG. 10A, the cross-section taken along 10C-10C in FIG. 10A.
Figure 10B:
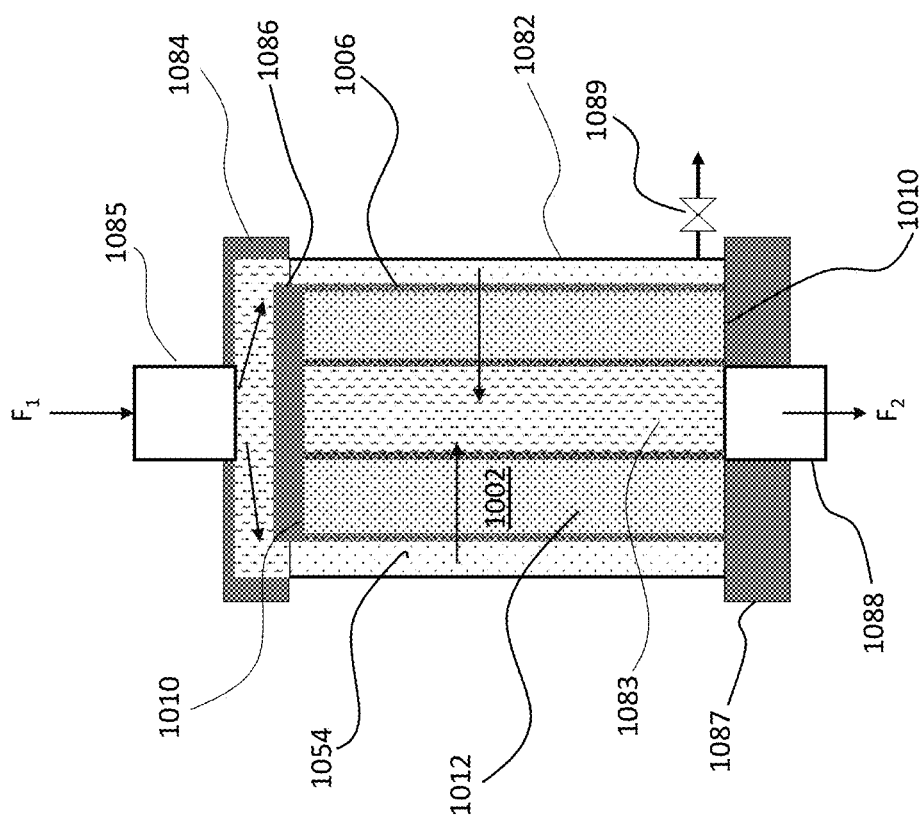
FIG. 10B is a side view of a cross-section of the cartridge filter of FIG. 10A, the cross-section taken along 10B-10B in FIG. 10A.

Referring now to FIGS. 10A-10C, a filter 1000 may be useful as filtration device for the removal of bacteria, virus, particulates, and chemical contaminants from drinking water. In particular, given that it may be useful to treat drinking water in decentralized locations (e.g., close in time and/or location to a point of use), the filter 1000 may have a compact form factor compatible with consumer use and, importantly, may be modular to facilitate replacement of filtration media with little or no need for tools or training.

The filter 1000 may include a porous structure 1002, a first sheet 1006, a seal 1010, a second sheet 1071, and a housing 1082. The first sheet 1006 may be a first cylinder having an inner diameter greater than an outer diameter of the second sheet 1071, and the first sheet 1006 and the second sheet 1071 may be axially aligned with one another such that an annulus is defined therebetween. The first sheet 1006, the seal 1010, and the second sheet 1071 may collectively define a volume 1012, and the porous structure 1002 may span each dimension of the volume 1012 as the first fluid $F_1$ (raw water in this case) is processed by the filter 1000. The housing 1082 may be nonpermeable and disposed about an outer diameter of the first sheet 1006. An annular region between the first sheet 1006 and the housing 1082 defines a first channel 1054, through which the first fluid $F_1$ (raw water) may flow during processing. In certain implementations, the filter 1000 may include a first cap 1084 releasably securable (e.g., through threaded engagement) to the housing 1082 and defining an inlet 1085 in fluid communication with the first channel 1054. The inner diameter of the second sheet 1071 may define a second channel 1083 through which the second fluid $F_2$ (purified water in this case) may flow.

The porous structure 1002 may be releasably positioned in the volume 1012. Thus, as one or more chemically active materials of the porous structure 1002 degrade in effectiveness in removing one more species from the first fluid $F_1$ (raw water), the porous structure 1002 may be removed from the volume 1012 and replaced. For example, at least a portion of the seal 1010 may be removable to provide access to the porous structure 1002. As a more specific example, the seal 1010 may include a second cap 1086 and a third cap 1087, each coupled to the first sheet 1006 and the second sheet 1071 to form planar boundaries of the volume 1012. The third cap 1087 may define an outlet 1088 through which the second fluid $F_2$ flowing along the second channel 1083 may exit the filter 1000. The porous structure 1002 may be accessible by removing one or both of the first cap 1084 and the second cap 1086. In instances in which access to the porous structure 1002 is via the second cap 1086, it shall be appreciated that the second cap 1086 may be accessible by removing the first cap 1084 from the housing 1082.

As an example, the first sheet 1006 may include a porous ceramic coating on an outer surface of a nickel alloy pipe to remove bacteria, virus, and particulates from the first fluid $F_1$ (raw water). As a more specific example, the porous ceramic coating (e.g., yttria-stabilized zirconia) may be about 4 microns thick and may have a pore size of about 0.05 microns, and the nickel alloy pipe may have a wall thickness of about 46 microns. In some implementations, the first sheet 1006 may have pore sizes greater than about 0.1 microns and less than about 2.0 microns and a porosity of about 40 percent. Additionally, or alternatively, the second sheet 1071 may be a porous ceramic tube having an outer diameter of about 18 mm, a thickness of about 2 mm, and a length of about 200 mm. The porous structure 1002 may include activated carbon powder having a surface area of about 1600 $m^2$/g and in a cylindrical form (e.g., formed through molding) with an inner diameter of about 18 mm, an outer diameter of about 45 mm, and a length of about 200 mm. The porous structure 1002 may be positioned between the first sheet 1006 and the second sheet 1071. The resulting assembly may have an area/volume ratio of about 106 $m^2/m^3$. The housing 1082 may include a polycarbonate tube of 50 mm diameter that encloses the assembly of the porous structure 1002, the first sheet 1006, and the second sheet 1071.

In use, the inlet 1085 may be connected (e.g., directly) to a water supply line. The first fluid $F_1$ (the raw water from the water supply) may flow into the first channel 1054 via the first cap 1084. Under a pressure gradient, the first fluid $F_1$ may flow through the first sheet 1006 and the second sheet 1071, via the porous structure 1002. The first fluid $F_1$ flowing through the second sheet 1071 may enter the bulk flow of the second fluid $F_2$ in the second channel 1083. The second sheet 1071 may provide mechanical support for the porous structure 1002 while reducing the likelihood that loose particles of the porous structure 1002 may enter the second fluid $F_2$ in the second channel 1083. Further, particulate, bacteria, and virus may be blocked by the first sheet 1006 while molecular contaminants (e.g., chlorine and/or organic compounds) may be are adsorbed on the active carbon material in the porous structure 1002. In certain implementations, the housing 1082 may be transparent to facilitate visual inspection of the condition of the first sheet 1006. When the first sheet 1006 is observed to be dirty, the first sheet 1006 may be flushed by opening a discharge valve 1089 in fluid communication with the first channel 1054. With the discharge valve 1089 open, the first fluid $F_1$ may pass over the first sheet 1006 with a flow rate sufficient to remove material that has accumulated on the first sheet 1006. When the activated carbon in the porous structure 1002 is saturated (e.g., as evidenced by water quality decline), the first cap 1084 and the second cap 1086 may be removed, and the porous structure 1002 removed and replaced.

While certain embodiments of filters have been described, other embodiments are additionally or alternatively possible. For example, while filters have been described as having one or more sheets with pores through which mass transfer may occur between a fluid and a porous structure, it shall be appreciated that additional or alternative fluid permeable interfaces may be used. For example, unless otherwise specified or made clear from the context, any one or more of the various different sheets described herein as being fluid permeable may additionally or alternatively include other forms of permeability. As a more specific example, any one or more of the fluid permeable sheets described herein may include sintered metal plates, flat metal meshes, thin ceramic plates, polymer membranes, or a combination thereof, in implementations in which such interfaces are compatible with a given use case of a filter.

The following experiments describe fluid processing results using various different filters and systems described herein. It is to be understood that these experiments and corresponding results are set forth by way of example only, and nothing in these examples shall be construed as a limitation on the overall scope of this disclosure.

Example I—Air Dehumidification Using One Fluid Permeable Interface

A filter may be prepared according to the technique described above with respect to FIGS. 2A-2C to form a filter having a single fluid permeable sheet, such as the filter 100 described above with respect to FIGS. 1A-1C. A dense stainless-steel foil of 50 μm thickness may be cut into a 5.0 cm×10.5 cm flat coupon to serve as a nonpermeable interface. A thin layer of RTV adhesive may be applied on the edge of the flat coupon for attachment of a magnetic seal with 4 cavities of 2.2 cm length×4.0 cm width×0.8 mm depth. The magnetic seal may be pressed on a hydraulic platform to assure the firm bonding and flatness of the frame. Next, 1.2505 g of dried silica gel powder (56 µm average particle size and BET surface area of 500 m²/g) may be poured into the four cavities to form a uniform packing layer of 0.8 mm thickness. With the silica gel power in the cavities, a 50 µm-thin porous nickel alloy sheet of 5.0 cm×10.0 cm, available for example, from Molecule Works Inc. of Richland, WA, may be placed on the magnetic seal to cover the adsorbent powder and to serve as the fluid permeable sheet of the filter. The porous nickel sheet may have a porosity of about 40% and pore size from 0.1 to 1.0 microns. The assembly may be pressed to form the filter 100, 200. The resulting filter had a surface area to the volume ratio of 1250 m²/m³.

Figure 11:
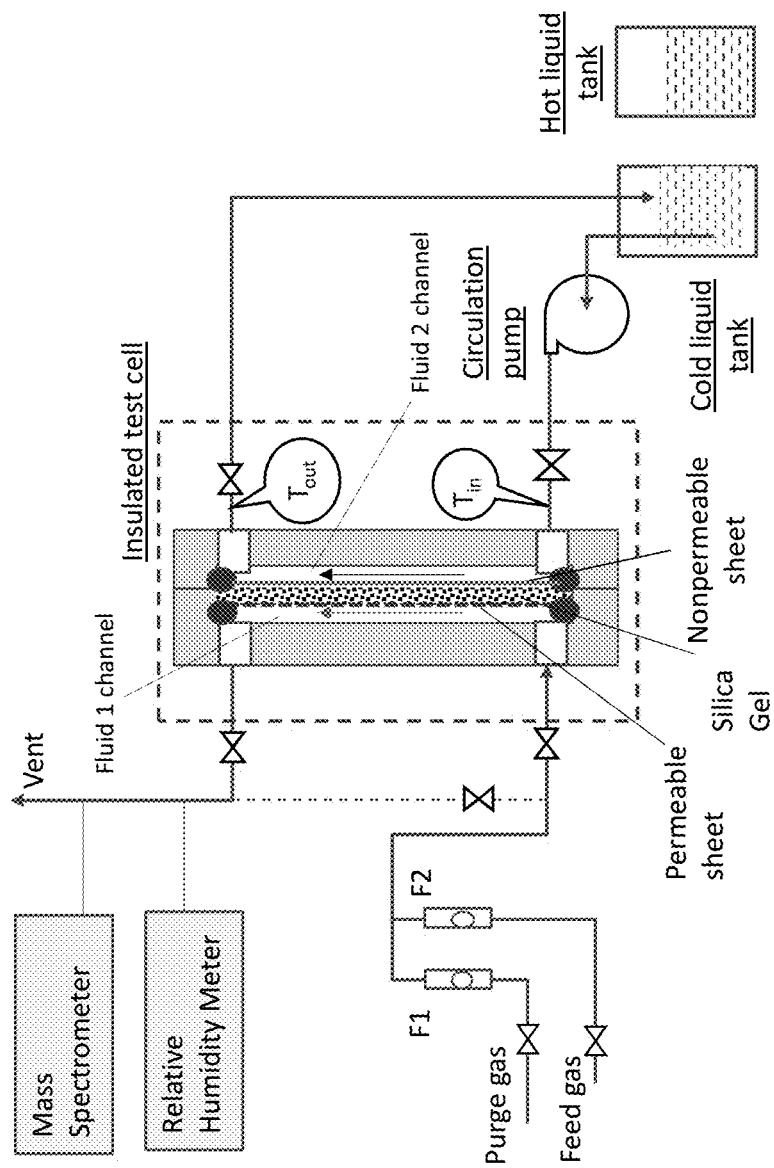
FIG. 11 is a schematic representation of a test apparatus for testing adsorption and regeneration of a filter having a porous structure between a permeable sheet and a nonpermeable sheet.

The filter may be loaded into a test cell made of polycarbonate with the dimensions listed in Table 1 below. The flow channels for Fluid 1 and Fluid 2 may be the same in this design. Adsorption and regeneration tests may be conducted on the apparatus shown in FIG. 11. Humid air was used as Fluid 1, while water may be used as Fluid 2. Via an opening on the side of the insulated test cell, the humid air may be introduced into contact with the permeable sheet of the filter. In the test configuration shown in FIG. 11, as the humid air flows over the permeable sheet, water vapor diffuses across the permeable sheet and adsorbs on the silica gel, and the heat of water vapor adsorption is removed by circulating Fluid 2 (cooling water) over the nonpermeable sheet. The saturated adsorbent may be regenerated by switching the Fluid 2 from cold to hot water, while the Fluid 1 (humid air) continuously flowed over the fluid permeable sheet. The composition of the gas exiting the fluid 1 channel may be analyzed by a humidity meter and a mass spectrometer. The inlet and outlet temperature of the second fluid flowing through the fluid 2 channel side may be measured with thermocouples.

50° C. and the second regeneration was done with hot water of 80° C. During regeneration, the air flow through Fluid 1 channel was maintained. The breakthrough curves for the first regeneration and the second regeneration overlap with the breakthrough curve for the fresh adsorbent, indicating completion of the regeneration. It is noted that within a 34-minute adsorption period, the water vapor level in the air stream exiting the Fluid 1 channel did not reach its feed level into the Fluid 1 channel. That is, full breakthrough did not occur.

Figure 12A:
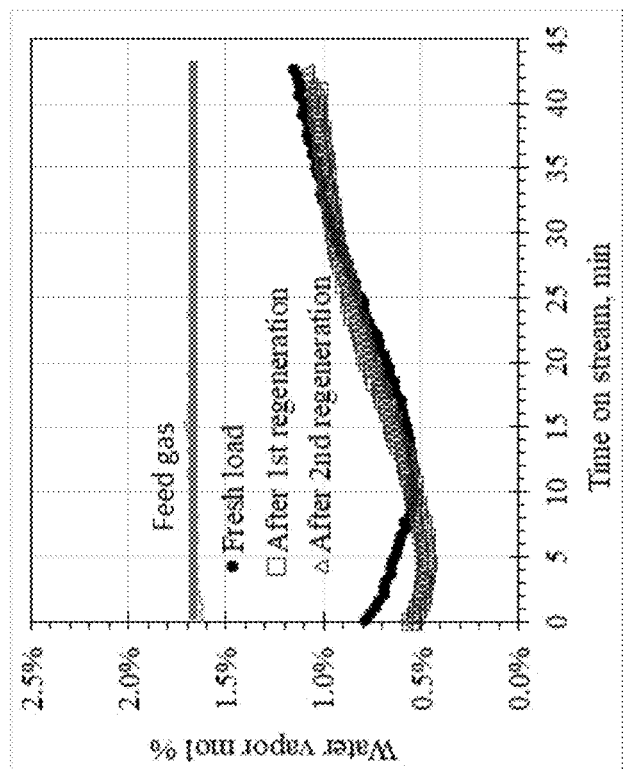
FIG. 12A is a graph of adsorbent breakthrough for fresh, 1st regenerated, and 2nd regenerated adsorbent in a filter including silica gel powder and tested, using the test apparatus of FIG. 11, with humid air flowing over a fluid permeable sheet of the filter and water flowing over a nonpermeable sheet of the filter.
Figure 12B:
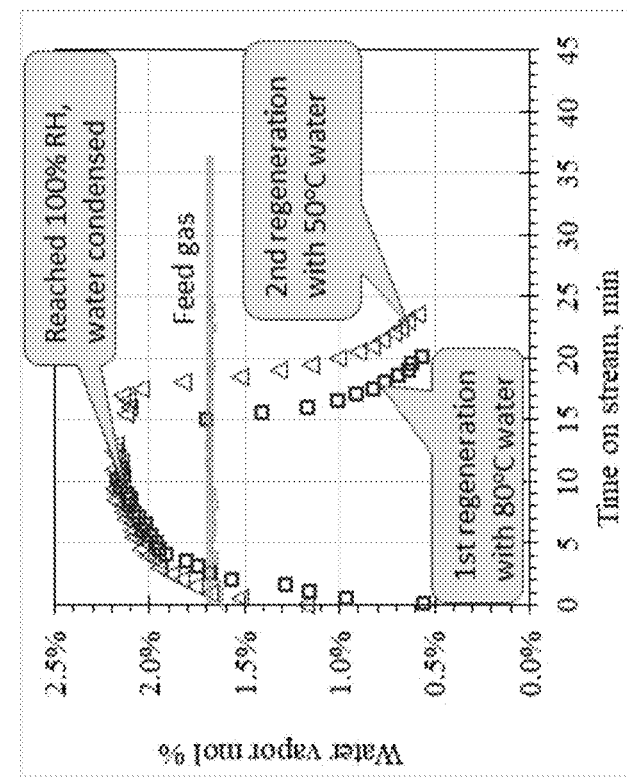
FIG. 12B is a graph of exit air water level of the flow that has moved over the fluid permeable sheet of the filter under the test conditions of FIG. 12B.

FIG. 12B is a graph of the exit air water level of the first fluid exiting the Fluid 1 channel. As shown, the exit air water level rapidly increased with the regeneration time and reached about saturation point (~2%) to condense under the environmental conditions. The regeneration was completed a few minutes earlier with water 80° C. than with water at 50° C. The regeneration was substantially completed within 20 min, which indicates rapid heating of the adsorbent material in the filter.

Space velocity (SV) and velocity (U) in the flow channel are calculated as follows:

$$SV = \frac{F_c}{V_c}$$

$$U = \frac{F_c}{SA_c}$$

where $F_c$=volumetric flow rate of fluid in the channel, cc/h; $V_c$=volume of the flow channel in contact with fluid permeable sheet, cc; $SA_c$=cross-sectional area of the channel for flow, cm².

Figure 13B:
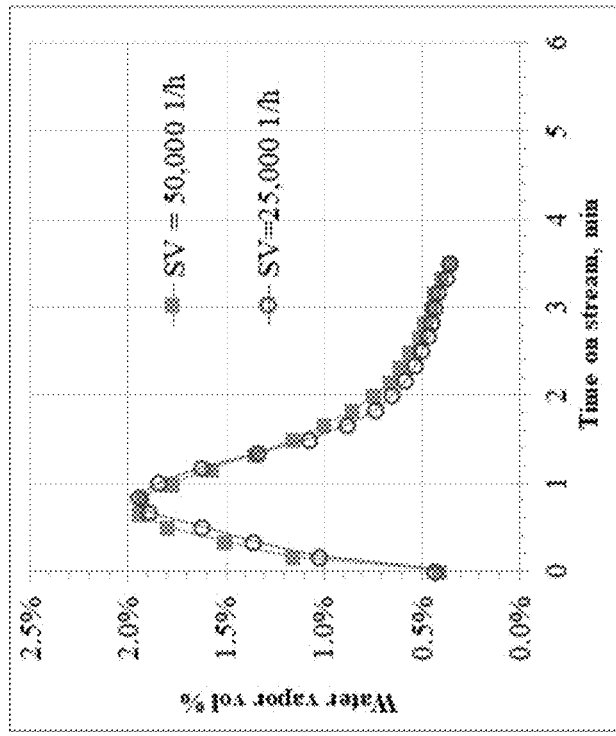
FIG. 13B is a graph of exit air water level of the flow that has moved over the fluid permeable sheet of the filter under the test conditions of FIG. 13B.
Figure 13A:
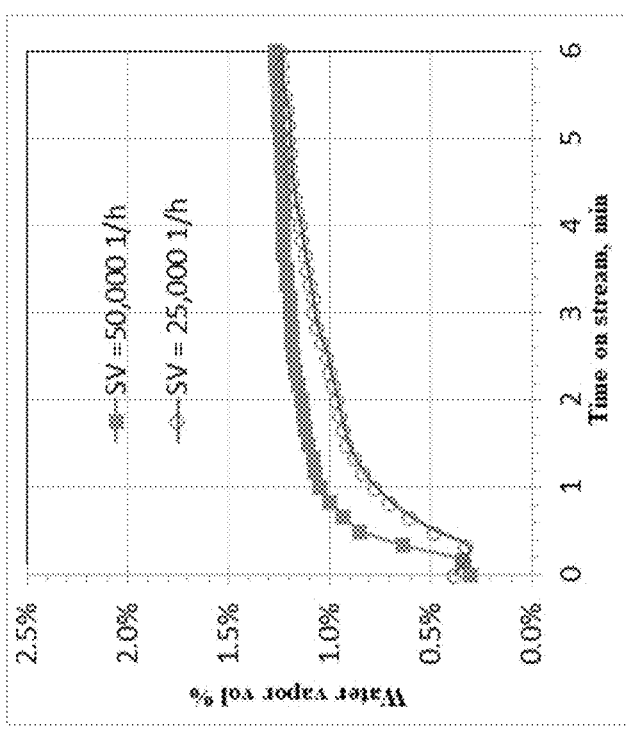
FIG. 13A is a graph of adsorbent breakthrough corresponding to different space velocities of humid air in the filter corresponding to the tests performed with respect to FIG. 13A.

Referring now to FIGS. 13A and 13B, the same filter was used to generate test results at higher space velocity of humid air. In particular, FIG. 12A is a graph of breakthrough curves at SV=25,000 1/h and SV=50,000 1/h. At such high space velocity, complete breakthrough occurred within 5

TABLE 1

Design dimensions of the device for testing performance of a filter loaded with adsorbent powder and having a single permeable sheet.

| Filter plate size | |
|---|---|
| width, cm | 5.0 |
| Length, cm | 10.0 |
| Fluid 1 flow channel | |
| Number of flow channels | 28 of 0.8 mm high × 1.2 mm wide channels |
| Flow length, cm | 9.35 |
| Overall width, cm | 4.0 |
| Cross-sectional area for open flow, cm² | 0.26 |
| Channel volume, cc | 2.4 |
| Fluid 2 flow channel — same as Fluid 1 flow channel | |

FIGS. 12A and 12B show adsorption and regeneration testing results. The same filter was tested a few times with in-situ regeneration. The adsorption was conducted at 22-24° C., SV=10,000 v/(v·h), and gas velocity of 25.6 cm/s under atmospheric pressure. The air pressure drop was about 300 Pa. During adsorption, the Fluid 2 channel was circulated with cold water of 21-24° C. at SV=1,875 v/(v·h), liquid velocity=4.8 cm/s. The pressure drop for the circulating water was about 0.01 bar.

FIG. 12A is a graph of the adsorption breakthrough for fresh, 1st regenerated, and 2nd regenerated adsorbent in the filter. The first regeneration was conducted with hot water at min. The pressure drops were 900 Pa and 2400 Pa for SV=25,000 1/h and SV=50,000 1/h, respectively. Compared to the results shown in FIG. 12A, the short breakthrough times in FIG. 13A indicate that the residence time was too short for water molecule to diffuse in the thickness direction of the adsorbent layer in the filter. Thus, the adsorbent layer thickness may be reduced to operate at high space velocity. The regeneration was conducted by circulating hot water of 75-78° C. (SV=1875 1/h, U=4.8 cm/s) in the Fluid 2 channel, while the feed air was kept flowing into the Fluid 1 channel at SV=50,000 1/h. As shown in FIG. 13B, the regeneration was substantially completed within only 3.5 min. The regeneration curves overlap for the adsorbents saturated at adsorption SV=25,000 and 50,000 1/h, because the same regeneration conditions were used.

The foregoing experimental results show the feasibility of a filter including two different kinds of interfaces—one interface for diffusional mass transport of water vapor between a bulk gas flow and adsorbent layer across a fluid permeable sheet and another interface for heat transfer between a bulk liquid flow and the adsorbent layer across a nonpermeable sheet. For example, the dense metal foil used as the nonpermeable sheet was effective to prevent any penetration of the water into the adsorbent layer under all the testing conditions and provided rapid thermal conduction. Further, air dehumidification was shown to be possible at high space velocity and low pressure drop, and the saturated adsorbent was rapidly regenerated by in situ heating with hot water.

Example II—$CO_2$ Adsorption Using a Filter with One Fluid Permeable Interface

A 5.0 cm×11.0 cm filter containing 1.79 g of 13X zeolite powder was prepared in the same way as described in Example I above. The resulting filter had a surface area to the volume ratio of 1250 $m^2/m^3$. The zeolite powder having average crystal size about 1 μm, as received from a commercial supplier was calcined at 550° C. for 5 h and loaded into the filter. The 13X filter was tested on the apparatus shown in FIG. 11. However, process fluids were changed. For the adsorption first fluid flowed through the Fluid 1 channel, a gas mixture of 15% $CO_2$, 80% $N_2$, and 5% He was used. For the heat exchanging second fluid flowed through the Fluid 2 channel, Duratherm 600 heating oil was used to heat up above 100° C. under atmospheric pressure.

Figure 14B:
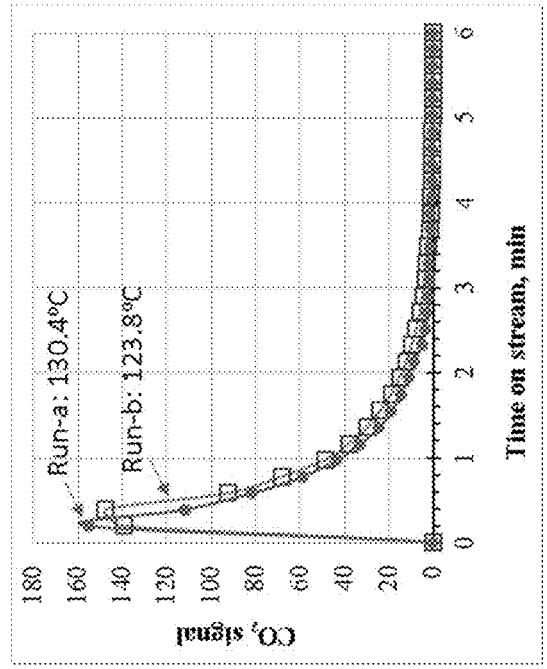
FIG. 14B is a graph of exit $CO_2$ level of flow that has moved over the fluid permeable sheet of the filter under the test conditions of FIG. 14B.
Figure 14A:
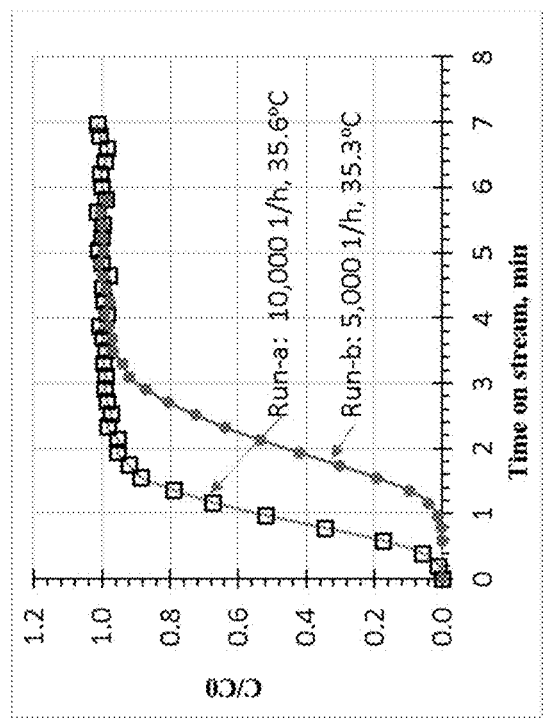
FIG. 14A is a graph of adsorbent breakthrough in a filter including 13X zeolite powder and tested, using the test apparatus of FIG. 11, with a gas mixture of 15% $CO_2$, 80% $N_2$, and 5% He flowed over a fluid permeable sheet of the filter and Duratherm 600 heating oil flowing over a nonpermeable sheet of the filter.

Referring now to FIGS. 14A and 14B, rapid $CO_2$ adsorption/regeneration was observed with the 13X filter. During adsorption, cold thermal fluid was circulated in the fluid 2 channel at SV=3,050 1/h and U=7.8 cm/s to keep the filter temperature uniform and constant. At SV=5,000 1/h, FIG. 1a shows 95% adsorption breakthrough at about 3 min. The breakthrough time is shortened to about 1.5 min as the space velocity is doubled. After the breakthrough, the saturated adsorbent was regenerated by circulating the hot oil at the same space velocity as used during adsorption, while the $CO_2$ gas mixture was switched to pure helium gas in the fluid 1 channel at the same space velocity. FIG. 13b shows substantial completion of regeneration within about 1 min. By increasing the hot oil temperature from 123.8 to 130.4° C., the regeneration time is slightly shortened. The adsorption and regeneration temperature of the nonpermeable sheet of the 13X filter was rapidly controlled by changing the thermal fluid temperature in the Fluid 2 channel.

Example III—Removal of Volatile Organic Compounds from Air Using a Filter with Two Fluid Permeable Interfaces A 5.0 cm×10.5 cm filter was prepared using a technique analogous to those described in the previous examples, except both sheets were fluid permeable, the adsorbent packing layer was increased to 3.2 mm, and ZSM-5 zeolite powder loaded. The ZSM-5 zeolite powder of $SiO_2/Al_2O_3$ ratio of 1500, single crystal size of 0.05-0.1 μm×0.2-0.6 μm, and BET surface area of 360-400 $m^2/g$ was acquired from the commercial source and was calcined at 550° C. for 5 hours prior to loading 2.65 g of the calcined ZSM-5 zeolite powder into the filter. The resulting filter had a surface area to the volume ratio of 312 $m^2/m^3$.

Figure 15:
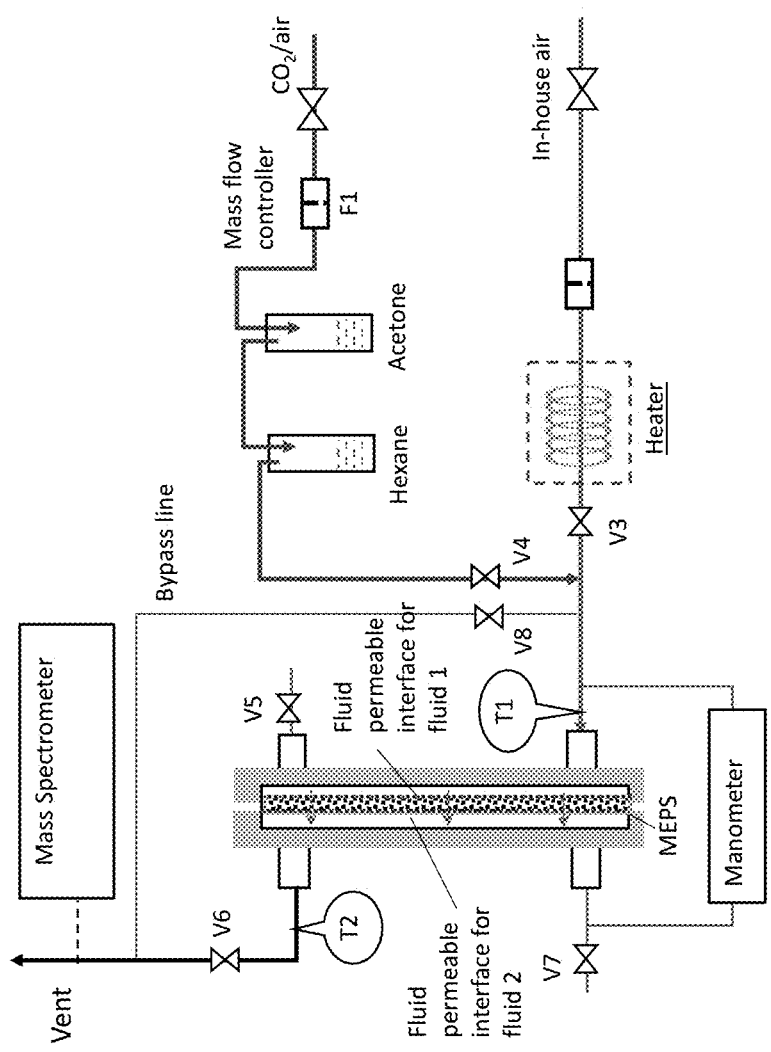
FIG. 15 is a schematic representation of a test apparatus used to test a filter having two fluid permeable sheets.

FIG. 15 is a schematic representation of a test apparatus used to test the filter having two fluid permeable sheets. Acetone and hexane vapor were added into the feed gas by letting a 0.13 vol % $CO_2$ air stream flow over two glass tubes filled with hexane and acetone liquid, respectively. The feed gas mixture served as the first fluid in this set of experiments. This first fluid was forced through a first fluid permeable sheet of the filter under a pressure gradient and comes out of the other fluid permeable sheet of the filter as a second fluid. As the first fluid passed through the filter, acetone and hexane were adsorbed on the zeolite crystals. The second fluid coming out of the test cell was analyzed by an inline mass spectrometer. Once the zeolite adsorbent was saturated, a hot air stream was introduced to desorb the adsorbed molecules.

Figure 16B:
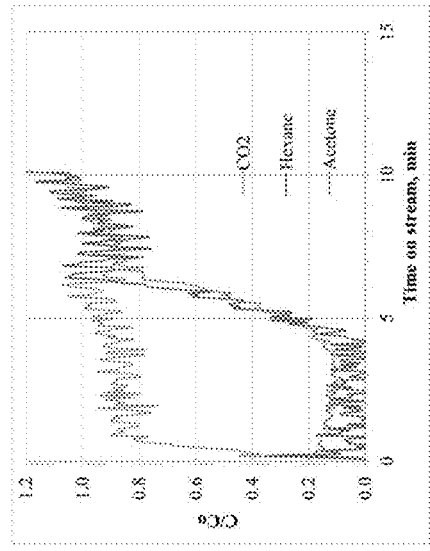
FIG. 16B is an adsorption breakthrough curve of the filter of FIG. 16A tested with a feed gas including acetone and hexane vapor along one of the fluid permeable sheets at a space velocity of 2000 1/h, a velocity of 0.18 cm/s, and having a pressure drop of 16.8 mbar through the filter.
Figure 16D:
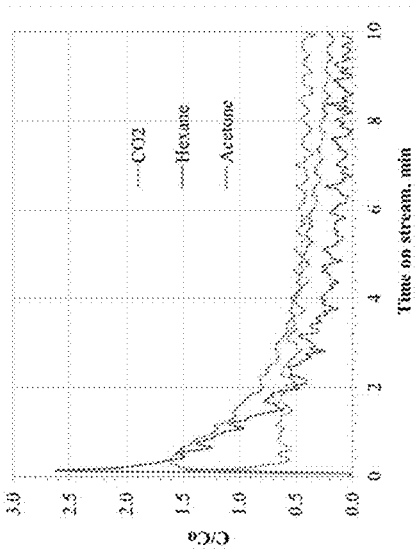
FIG. 16D is a graph of regeneration the saturated adsorbent of the filter of FIG. 16A by purging the filter with in-house air at 50° C., corresponding to a space velocity of 1000 1/h, a velocity of 0.09 cm/s, and a pressure drop of 11.4 mbar through the filter.
Figure 16A:
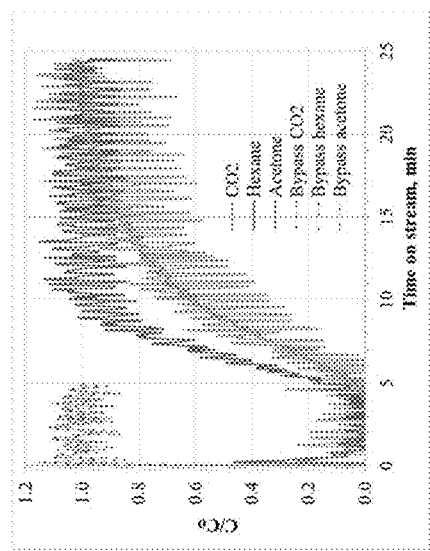
FIG. 16A is an adsorption breakthrough curve of a filter including ZSM-5 zeolite powder between two fluid permeable sheets and tested, using the test apparatus of FIG. 15, and flowing a feed gas including acetone and hexane vapor along one of the fluid permeable sheets at a space velocity of 1000 1/h, a velocity of 0.09 cm/s, and having a pressure drop of 11.4 mbar through the filter.
Figure 16C:
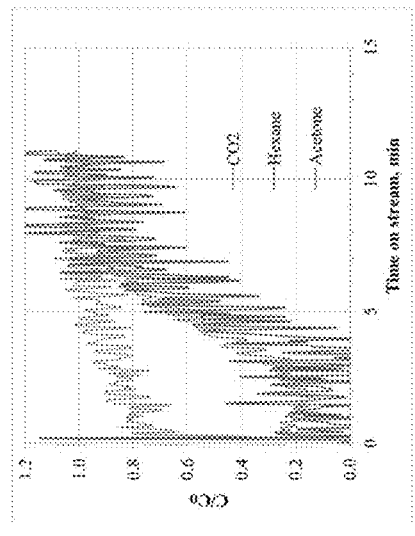
FIG. 16C is graph of adsorption breakthrough of the filter of FIG. 16A tested with a feed gas including acetone and hexane vapor along one of the fluid permeable sheets at a space velocity of 4000 1/h, a velocity of 0.136 cm/s, and a pressure drop of 32.2 mbar through the filter.

FIGS. 16A-C are graphs of adsorption breakthrough curves for the ZSM-5 zeolite filter at three different space velocities tested according to the technique described above: space velocity of 1000 1/h, a velocity of 0.09 cm/s, and having a pressure drop of 11.4 mbar through the ZSM-5 zeolite powder (FIG. 16A); a space velocity of 2000 1/h, a velocity of 0.18 cm/s, and having a pressure drop of 16.8 mbar (FIG. 16B); and a space velocity of 4000 1/h, a velocity of 0.136 cm/s, and a pressure drop of 32.2 mbar (FIG. 16C). In this case, the space velocity was calculated by dividing the flow rate with the ZSM-5 filter volume exposed to the feed, which is 4 cm width×9.35 cm length×3.2 mm depth (12.0 $cm^3$). The adsorption was conducted at temperature of about 24° C. The relative humidity was 34.2, 46.5, and 40.4% for the three runs shown in respective FIG. 16A, FIG. 16B, and FIG. 16C. It is worth noting that the pressure drops for the first fluid to go through the ZSM-5 filter increases with the velocity but is less than 40 mbar under the testing conditions. The small pressure drop through the packed adsorbent layer of such small zeolite crystals is attributed to low velocity and thinness of the fluid permeable sheets used to form the ZSM-5 filter. At such thinness, hexane and acetone were removed to below the detection limit within 5 min of the adsorption run time for all the three runs. The breakthrough time did not decrease with increasing space velocity. Without wishing to be bound by theory, it is believed that this is a result of better flow distribution and more convection flow over the diffusion transport at higher space velocity.

Referring now to FIG. 16D, the saturated adsorbent in the ZSM-5 filter was regenerated by purging the filter with in-house air at 50° C. (corresponding to a space velocity of 1000 1/h, a velocity of 0.09 cm/s, and a pressure drop through the ZSM-5 filter of 11.4 mbar), and the hexane and acetone were observed to desorb rapidly from the adsorbent. Substantial desorption was completed within about 5 min. No significant $CO_2$ desorption occurred, while some $CO_2$ adsorption was observed. Without wishing to be bound by theory, it is believed that some of the $CO_2$ adsorption sites were not regenerated under these regeneration conditions.

This example demonstrates, among other things, that rapid gas adsorption and regeneration may be realized by letting the gas stream flow through a filter including two fluid permeable sheets and fine adsorbent particles with small pressure drop.

Example IV—Removal of Water from Ethanol Solvent Using a Filter with Two Fluid Permeable Interfaces A 5 cm×10.5 cm filter was prepared with two fluid permeable sheets by following the techniques described in the previous examples. A seal including four 2 cm×4 cm loading zones was formed from magnetic tape and sandwiched by two porous nickel alloy membrane sheets available from MoleculeWorks, Inc. of Richland, WA. Molecular sieved, 3A powder from a commercial supplier was used. The powder had a surface area of 400 m$^2$/g and particle size at micrometer levels. In addition to the dry powder loading technique used in the previous examples, a wet loading technique was evaluated as part of this set of tests. The zeolite powder was mixed with a 13X zeolite growth solution or sol to form thick slurry. Then, the slurry was pasted into the cavities of the seal. After the adsorbent was covered with a fluid permeable sheet, the assembly was pressed on a hydraulic platform to make sure that the membrane sheets are attached on the seal firmly and the fluid permeable sheets stay flat. Table 2 below lists three filters of different thicknesses prepared and tested in this example. The three filters that were formed using the wet loading technique were dried in oven and further activated at 180° C. in vacuum oven for 1 h before any testing.

Figure 17:
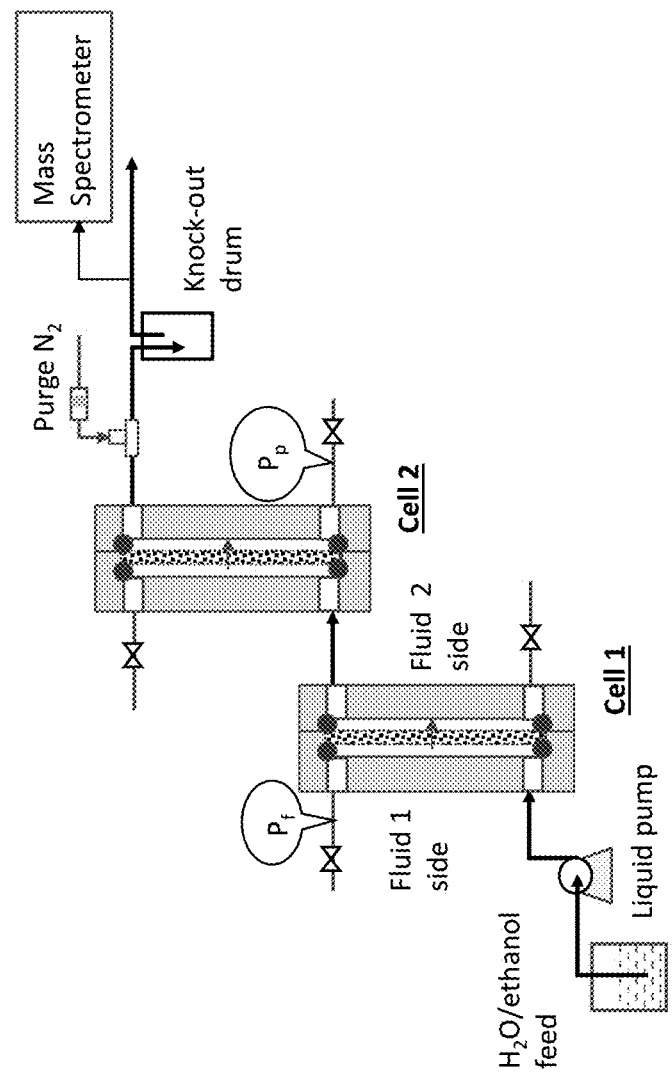
FIG. 17 is a schematic representation of a test apparatus used to test liquid-phase dehydration of ethanol solvent using a filter including two fluid permeable sheets.

FIG. 17 is a schematic representation of a test apparatus used to test liquid-phase dehydration of ethanol solvent is immediately detected by mass spectrometer and reaches its full signal within about 2 min. By comparison, the full breakthrough of water occurs in about 12 min with the filter having a thickness of 0.8 mm and in about 28 min with the filters having thicknesses of 1.6 mm and 3.2 mm. With the 0.8 mm thick filter, no water vapor signal was detected within first 2 min. With the increasing thickness, the water signal started rising after a longer time. Without wishing to be bound by theory, it is believed that the breakthrough time increased with the adsorbent loading because of increased residence time. The fluid/adsorbent contact is typically characterized by liquid hourly space velocity. The space velocity listed in Table 2 is calculated by dividing the feed flow rate with the volume of the MEPS filtering medium that is exposed to the feed flow in single stage, which is 4.0 cm×9.35 cm×thickness. The residence time is inverse of space velocity. The liquid velocity through the filters tested was as low as 0.00018 cm/s. Again without wishing to be bound by theory, the difference in the breakthrough curve shape among three filters likely results from variation in the particle packing uniformity and flow distribution.

TABLE 2

Adsorbent loading of the filter and test cell testing conditions

| | Filter | | | Test cell | | | |
|---|---|---|---|---|---|---|---|
| Adsorbent thickness, mm | Area/volume ratio, m$^2$/m$^3$ | Zeolite loading method | Packing density of zeolite, g/cc | Filter/cell, v/v | SV, 1/h | U, cm/s | Pressure drop, kPa |
| 0.8 | 1250 | Slurry | 0.71 | 0.38 | 80 | 0.00018 | 4.5 |
| 1.6 | 625 | Dry powder | 1.26 | 0.55 | 40 | 0.00018 | 13.1 |
| 3.2 | 312 | Dry powder | 0.94 | 0.71 | 20 | 0.00018 | 13.7 | using the filters prepared as described above. Denatured ethanol consisting of about 90.5% EtOH, 5% methanol, and 4.5% isopropanol was added with 1.5% water (all by weight %) and used as feed. Two identical test cells (Cell 1 and Cell 2) are connected in series. No other fluids were introduced into the Fluid 1 or Fluid 2 side of the filter. The feed was pumped to the Fluid 1 side of Cell 1, flowed through the filter, and into the Fluid 2 side of Cell 1, and then into the Fluid 1 side of Cell 2. The dehydrated solvent coming out of the Fluid 2 side of Cell 2 was purged by nitrogen gas. The purge gas carrying evaporated water and ethanol vapors was analyzed using mass spectrometry (MS). All of the dehydration tests were performed at room temperature (23.8° C.), and the other process conditions are listed in Table 2 below.

The volume fraction of the MEPS in the test cell increased as its thickness was increased because the channel spacing in the Fluid 1 side and the Fluid 2 of each of Cell 1 and Cell 2 were kept at 0.8 mm. With the MEPS filter design used for these experiments, the pressure drops for the fluid to pass through two-stage filters loaded with the zeolite powder was small. Even with the thickest filter (3.2 mm), the overall pressure drop was only 13 kPa. By comparison, a conventional column packed with fine particles for adsorption separation of liquid fluids is typically ranged over a few to hundreds of bars.

Figure 18B:
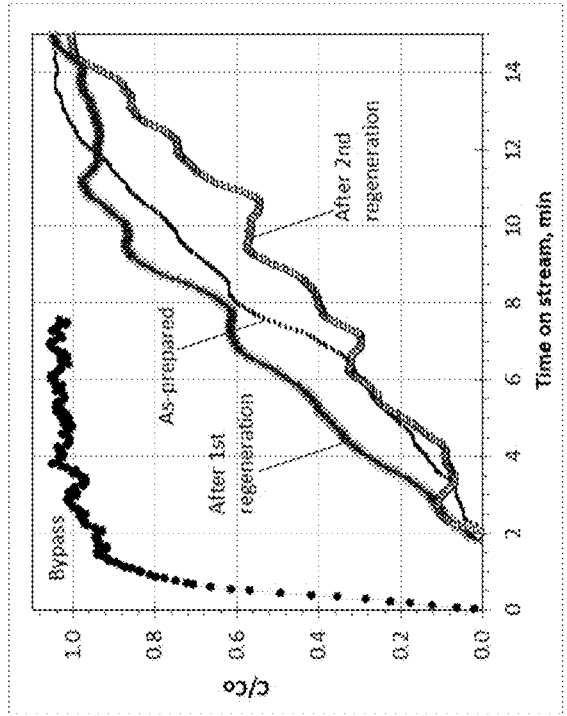
FIG. 18B is a graph of adsorption breakthrough of one of the three filters tested according to FIG. 18A, each breakthrough curve corresponding to different amounts of regeneration.
Figure 18A:
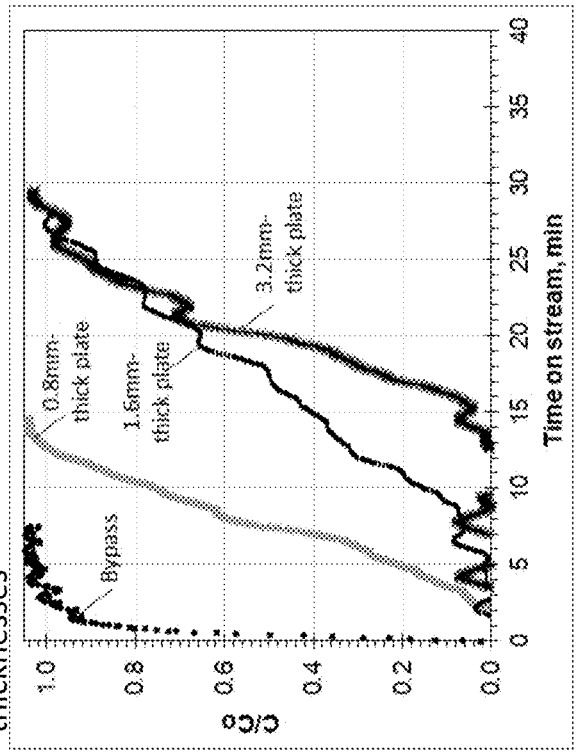
FIG. 18A is a graph of adsorption breakthrough during testing carried out using the test apparatus of FIG. 17 for liquid-phase dehydration of ethanol solvent using three different filter configurations, with each filter having a different thickness and including two fluid permeable sheets.

FIG. 18A is a graph of adsorption breakthrough curves for the three filters tested. The bypass curve in FIG. 18 indicates response dynamics mass spectrometry to the testing and sampling line. When the feed bypasses Cell 1, water vapor After a given test, each filter was unloaded from the test cell and regenerated by removing adsorbed water.

FIG. 18B is a graph of the adsorption breakthrough curves of the 0.8 mm-thick filter after two times of regeneration. First regeneration was done by heating 60 min at 180° C. in the oven. Its adsorption capacity is slightly less than the fresh one. The second regeneration was conducted by heating 60 min at 180° C. under vacuum. The second regeneration filter performance shows higher adsorption capacity than the fresh and first regenerated filter performance, which indicates that more adsorbed water was removed by heating under vacuum. Given that the zeolite and nickel sheet are durable materials the filter can be repeatedly used, with frequent regeneration.

Comparative tests were conducted using the 3A zeolite powder directly for dehydration of the ethanol solvent. The 3A powder was added into the ethanol solvent and stirred overnight to keep the fluid/adsorbent contacting and water adsorption into the zeolite crystal occur. After the mixing was done, the beaker was left still for the solid zeolite particles to settle down. However, the top portion of the solution remained cloudy after the particles settled on the bottom of the beaker. Some nano-sized particulates likely produced from attrition of the zeolite particle/crystal so that a stable particulate suspension was formed. The number of turbidity unit (NTU) for the clarified top ethanol solvent was 56. By comparison, all the dehydrated solvent produced from the adsorption runs on the filters tested in this set of experiments had NTU of zero, which means that all the zeolite particle and particulates were contained by the fluid permeable sheets and there was no leakage on the filter.

Figure 19:
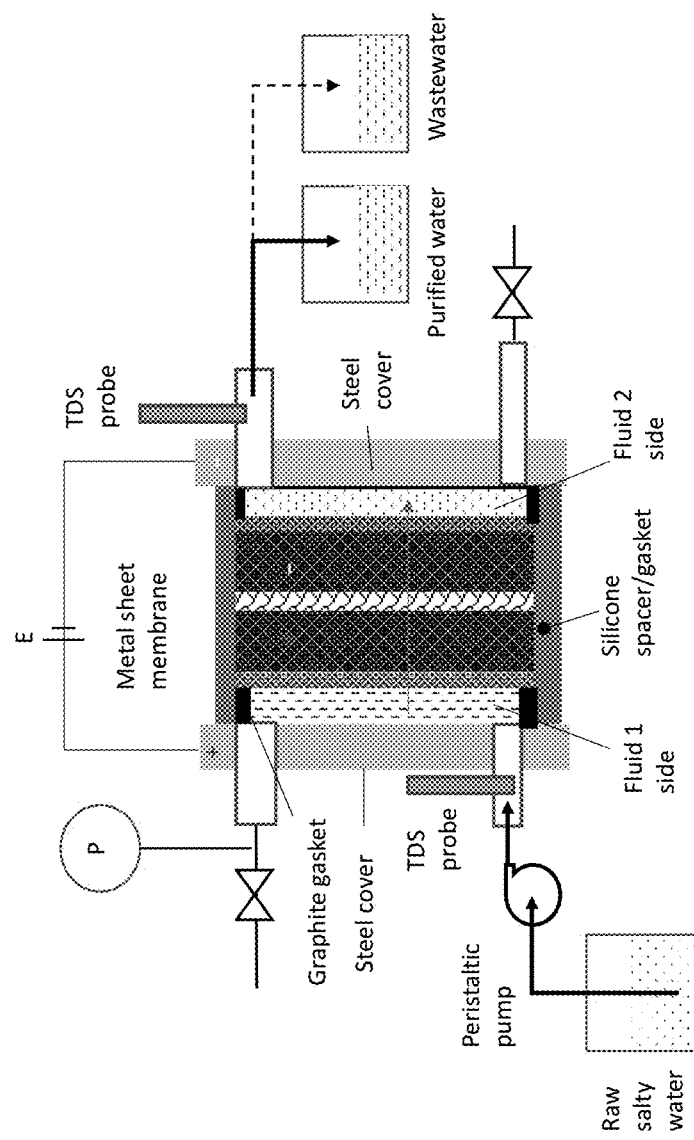
FIG. 19 is a schematic representation of a test apparatus including a filter that may be electrically charged at two interfaces.

Example V. Removal of Metal Ions from Water Using Filter with Two Charged Membrane Interfaces FIG. 19 is a schematic representation of a test apparatus including a filter that may be electrically charged at two interfaces. A first magnetic seal and a second magnetic seal were formed. Each seal was 5 cm×11 cm and defined a 4 cm×10 cm cavity with 0.8 mm thickness. A first porous nickel alloy membrane sheet of 35% porosity and 40 μm thickness was attached to bottom of first magnetic seal. The cavity of the first magnetic seal was fully filled with porous carbon particles. The carbon particle layer was covered with a 0.21 mm-thick flat glass fiber separator. Then, the second magnetic seal was placed on the top of the separator and filled up with the porous carbon particles. A second porous nickel sheet was placed on top of the second magnetic seal to cover the carbon particle to form a filter with an area/volume ratio of 555 $m^2/m^3$. The filter was held together by magnetic attraction of the porous nickel sheets to the first magnetic seal and the second magnetic seal. The filter used for these experiments is analogous to the filter 876 described above with respect to FIGS. 8A and 8B. The porous nickel sheets and porous carbon particles were electrically conducting. The separator served the function of i) ensuring the two-membrane sheet/carbon structures on the two sides stay insulated, ii) preventing cross over of the carbon particles between the two plates, and iii) allowing only water to flow through. The glass fiber had nominal pore size of 0.6 μm.

Capacitive deionization was tested using the filter described above and the apparatus shown in FIG. 19. The carbon-loaded filter was loaded into a fixture including stainless-steel cover plates. The fluid permeable sheets of the filter and the stainless-steel cover plates on two sides of the test cell were sealed with graphite gaskets to form respective Fluid 1 and Fluid 2 flow channels. The graphite gasket was electrically conductive so that the membrane/carbon inside the test cell could be charged via the steel plate. The silicone gasket was an insulator and kept the two steel cover plates insulated from each other. Salty water was pumped into the Fluid 1 side of the test cell and flowed to the Fluid 2 side of the test cell via the filter. With the fluid permeable sheets oppositely charged and the salty water flowing through the filter, the anions and cations were attracted to the positively charged carbon and negatively charged carbon, respectively, between the fluid permeable sheets. Purified water was collected at the outlet of Fluid 2 side. Once the carbon reached its capacity and no longer held any more ions, the electrical charging was turned off and the ions on the carbon were washed out of the filter. The water with concentrated ions or salts was collected in a wastewater tank during the regeneration. The cell was operable with periodic adsorption and regeneration to produce the purified water and wastewater. Total dissolved solids (TDS) in the inlet and outlet water were monitored with TDS meters.

Since the ions were adsorbed on the charged carbon surface, carbon of high specific surface area and high packing density is generally desirable. However, carbon of high surface area and high packing density has a high fraction of small pores, micro-pores, leading to slow diffusion rates. By creating convective flows around the particles with filter designs described herein, external mass transfer (mass transfer from bulk fluid to external surface of the particle) is greatly enhanced. The adsorption and desorption kinetics may be affected by diffusional mass transfer inside the particle.

Table 3 lists the properties of two carbon materials used to make the filters tested in this set of experiments. It is worth noting that both carbon B and E filters show low pressure drop at water flux of 40 to 80 $L/m^2/h$ tested in this example. The carbon E has primary particle size of 39.5 nm. The low pressure drops for the filter packed with such small particles suggests significant presence of inter-particle voids in the packed layer.

TABLE 3

Carbon materials and testing conditions used

| Carbon | B | B | E | E |
|---|---|---|---|---|
| Particle size | Agglomerates < 160 μm | | Primary particle = 39.5 nm | |
| Surface area, $m^2/g$ | 1600 | | 800 | |
| Loading, g | 1.23 | 1.23 | 1.61 | 1.61 |
| Packing density, g/cc | 0.19 | 0.19 | 0.25 | 0.25 |
| Flux, $L/m^2/h$ | 40 | 80 | 40 | 80 |
| Pressure drop, bar | 0.05 | 0.14 | 0.04 | 0.11 |

Removal of salts using the filter under electrical charging was demonstrated with the testing results of three water feeds: tap water, $CaCl_2$+tap water, $CaCl_2$+deionized water. The tap water had TDS of 80 ppm. Addition of $CaCl_2$ into the tap water was to increase its hardness. The $CaCl_2$+tap water feed had TDS of 348 ppm. The $CaCl_2$ added deionized water served as a model feed and had TDS of 270 ppm.

Figure 20B:
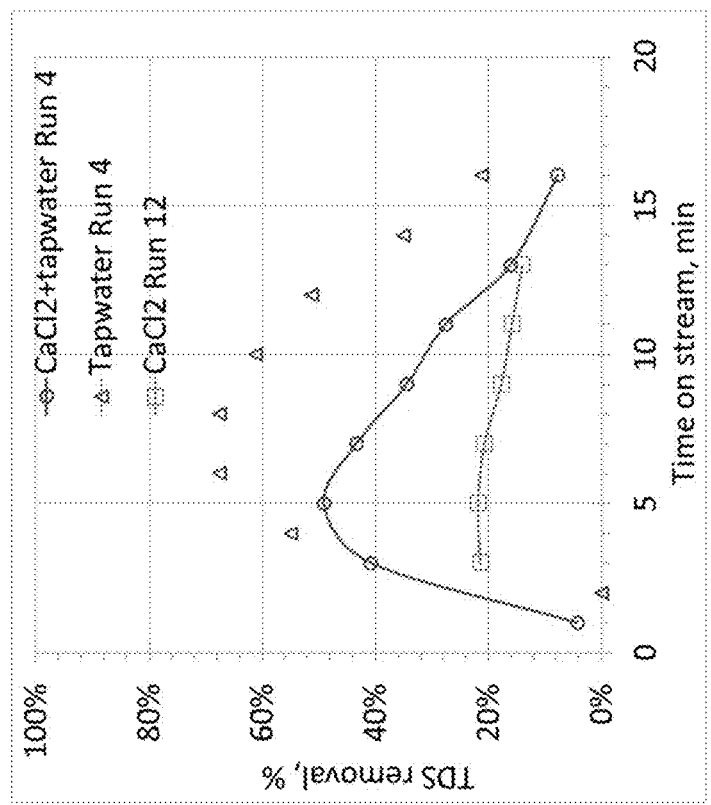
FIG. 20B is a graph of percent removal of TDS, corresponding to the test results shown in FIG. 20A.
Figure 20A:
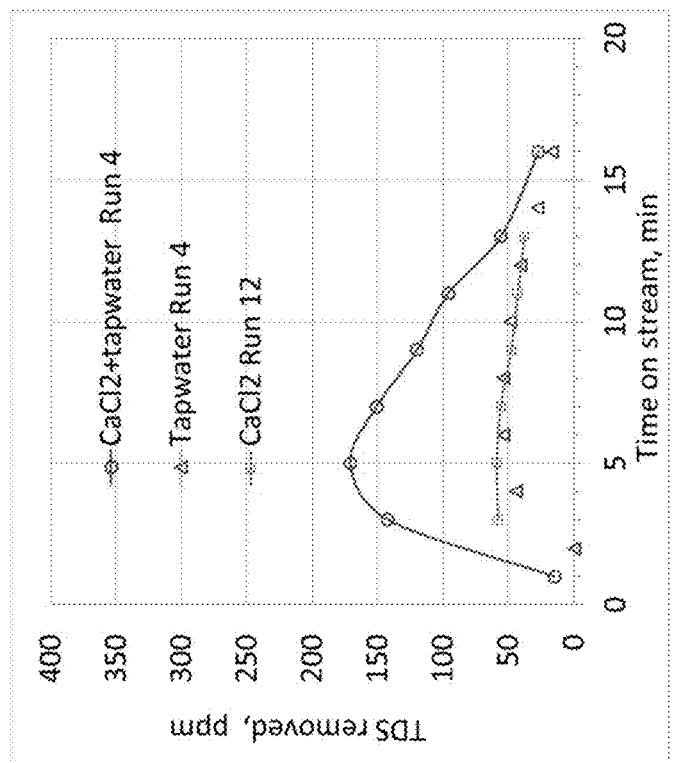
FIG. 20A is a graph of removal of total dissolve solids (TDS) from three water feeds with time on stream when 1.2V is applied to a filter loaded with carbon B and tested using the test apparatus of FIG. 19.

FIG. 20A is a graph of removal of TDS (total dissolved solids) from the three water feeds with time on stream when 1.2V is applied to the filter loaded with carbon B. The feed water flowed through the filter at flux of 80 liter/$m^2$/h. Significant removal of TDS was obtained. Interestingly, TDS removal from the $CaCl_2$)-added tap water was higher than the $CaCl_2$)-added deionized water, suggesting some promotional effects of tap water impurities on the desalination performance. The removal decreased with time on steam as the carbon surface gradually became saturated.

FIG. 20B is a graph of percent removal of TDS, corresponding to the test results shown in FIG. 20A. The percent removal indicates that the desalination method is effective for removal of $CaCl_2$) (e.g., softening of water).

Figure 21:
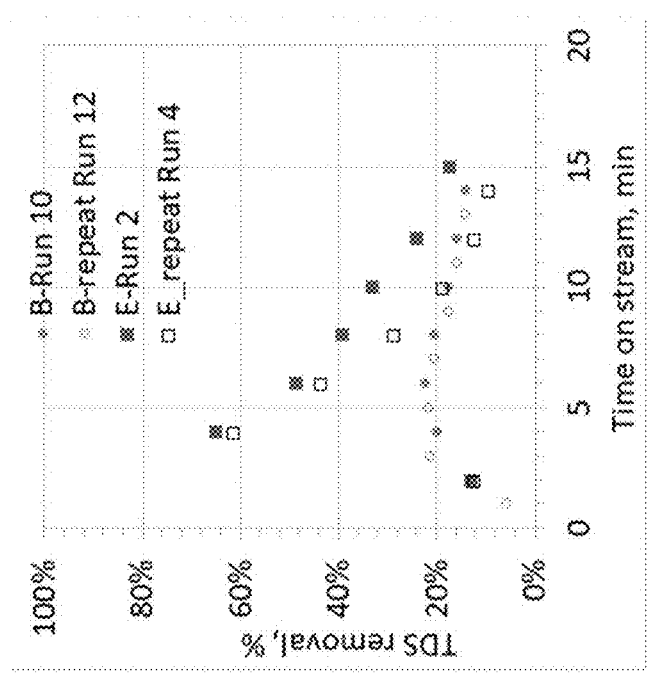
FIG. 21 is graph of percent removal of TDS using a filter loaded with carbon B and filter loaded with carbon E for desalination of a water feed using the test apparatus of FIG. 19.

FIG. 21 is graph of percent removal of TDS with respective filters loaded with carbon B and E for desalination. For the conditions shown in FIG. 21, $CaCl_2$)-added deionized water was used as the feed at flux=80 $L/m^2/h$. TDS removal rate obtained with carbon E was higher than carbon B. The higher TDS removal rate was consistent with higher current recorded.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A device for processing fluid, the device comprising:
   a porous structure including one or more chemically active materials comprising at least one of an adsorbent, a sorbent or a catalyst; and
   a frame including an encapsulating structure configured to encapsulate the porous structure, comprising:
      a first sheet on a first side of the porous structure, wherein the first sheet is porous and a ratio of an area of the first sheet to a volume of the porous structure is greater than about 10 $m^2/m^3$ and less than about 10,000 $m^2/m^3$;
      a second sheet parallel with the first sheet on a second side of the porous structure opposite the first side; and
      a seal around a perimeter of the porous structure and coupled to the first sheet and second sheet.

2. The device of claim 1, wherein the porous structure comprises a plurality of packed particles encapsulated by the encapsulating structure and having an average particle size less than about 200 microns and a minimum particle size of greater than about 0.03 microns.

3. The device of claim 1, wherein the porous structure has a void fraction greater than about 0.3 and less than about 0.8, and the one or more chemically active materials have a BET surface area greater than about 100 $m^2/g$ and less than about 5000 $m^2/g$.

4. The device of claim 1, wherein the first sheet has a sheet thickness of greater than about 20 microns and less than about 200 microns, and the first sheet has an open area fraction of greater than 30 percent and less than about 65 percent.

5. The device of claim 1, wherein the second sheet is nonpermeable to fluid and has a thermal conductivity greater than about 10 W/m·K.

6. The device of claim 1, wherein the second sheet is fluid permeable and comprises a plurality of pores.

7. A method of fabricating a device for processing fluid, the method comprising:
   introducing one or more chemically active materials into a cavity defined by a seal and one of a plurality of sheets;
   covering the cavity, and the one or more chemically active materials therein, with another one of the plurality of sheets, wherein the seal and the plurality of sheets form a frame and collectively define an encapsulating structure, wherein the encapsulating structure has a width between the plurality of sheets that is less than any other dimension of the encapsulating structure; and
   forming a porous structure including the one or more chemically active materials, wherein the porous structure spans each dimension of the encapsulating structure, and the porous structure is in fluid communication with an environment beyond the frame via fluid permeability of one or more of the plurality of sheets, and the plurality of sheets comprises a porous first sheet and a ratio of an area of the porous first sheet to a volume of the porous structure is greater than about 10 $m^2/m^3$ and less than about 10,000 $m^2/m^3$.

8. The method of claim 7, wherein the forming of the porous structure includes heating a slurry of the one or more chemically active materials in a binder to form the porous structure in the encapsulating structure or placing one or more preformed sheets of the porous structure in the cavity.

9. The device of claim 1, wherein the one or more chemically active materials are immobilized in the encapsulating structure, a thickness of the first sheet is less than 3 mm, a thickness of the second sheet is less than 2 mm, and a thickness of the porous structure is in a range from 0.1 mm to 100 mm.

10. The device of claim 1, further comprising:
a first flow channel adjacent the first sheet and having a width greater than about 0.3 mm and less than about 5.0 mm and configured to enable a first fluid to contact the first sheet and conduct at least one of adsorption, absorption or reaction with the one or more chemically active materials; and
a second flow channel adjacent the second sheet and having a width greater than about 0.3 mm and less than about 5.0 mm and configured to enable a second fluid to contact the second sheet and conduct at least one of heat transfer or mass transfer with the one or more chemically active materials.

11. A system for processing a process fluid, the system comprising:
a plurality of filtering units, each filtering unit comprising:
a porous active material comprising at least one of an adsorbent, a sorbent or a catalyst; and
a frame including an encapsulating structure configured to encapsulate the porous active material, comprising:
a porous first sheet on a first side of the porous active material, wherein a ratio of an area of the porous first sheet to a volume of the porous active material is greater than about 10 $m^2/m^3$ and less than about 10,000 $m^2/m^3$;
a second sheet parallel with the porous first sheet on a second side of the porous active material opposite the first side; and
a seal around a perimeter of the porous active material and coupled to the porous first sheet and the second sheet; and
a chassis supporting the plurality of filtering units spaced apart from one another with the porous first sheets of the plurality of filtering units defining a first flow channel for the process fluid, and the second sheets of the plurality of filters defining a second flow channel for a heat exchange fluid.

12. The system of claim 11, wherein the porous active material comprises a chemically active material immobilized in the encapsulating structure, the porous active material has a void fraction greater than about 0.3 and less than about 0.8, the porous first sheet has a thickness less than 2 mm, the second sheet has a thickness less than 2 mm, and a width of the encapsulating structure is greater than about 0.1 mm and less than about 100 mm.

13. The system of claim 11, wherein a width of the first flow channel is greater than about 0.3 mm and less than about 5.0 mm, a width of the second flow channel is greater than about 0.3 mm and less than about 5.0 mm, and the chassis comprises at least one fluid introduction port or conduit connected to at least one of the first flow channel or second flow channel in the plurality of the filtering units.

14. The system of claim 11, further comprising a first flow channel spacer in the first flow channel and configured to maintain a width of the first flow channel.

15. The system of claim 11, further comprising a second flow channel spacer in the second flow channel and configured to maintain a width of the second flow channel.

16. The system of claim 11, wherein the first sheet is configured to be applied with a first voltage and the second sheet is configured to be applied with a second voltage opposite the first voltage.

17. A system for processing a process fluid, the system comprising:
a plurality of filtering units, each filtering unit comprising:
a porous active material comprising at least one of an adsorbent, a sorbent or a catalyst; and
a frame including an encapsulating structure configured to encapsulate the porous active material, comprising:
a porous first sheet on a first side of the porous active material, a ratio of an area of the porous first sheet to a volume of the porous active material is greater than about 10 $m^2/m^3$ and less than about 10,000 $m^2/m^3$;
a nonpermeable second sheet parallel with the porous first sheet on a second side of the porous active material opposite the first side, wherein the nonpermeable second sheet has a size greater than a size of the porous first sheet, has a thickness less than 2 mm, has a thermal conductivity greater than about 10 W/(m·K), and comprises a plurality of flow slots configured to accommodate flow in a direction perpendicular to the nonpermeable second sheet; and
a seal around a perimeter of the porous active material and coupled to the porous first sheet and nonpermeable second sheet;
a chassis supporting the plurality of filtering units spaced apart from one another with the porous first sheets of the plurality of filtering units defining a first flow channel for the process fluid, and the nonpermeable second sheets of the plurality of filters defining a second flow channel for a heat exchange fluid; and
an isolator disposed around the plurality of flow slots in the nonpermeable second sheet and configured to separate the process fluid from the heat exchange fluid.

18. The system of claim 17, wherein the porous active material comprises a chemically active material immobilized in the encapsulating structure, the porous active material has a void fraction greater than about 0.3 and less than about 0.8, the porous first sheet has a thickness less than 2 mm, and a width of the encapsulating structure is greater than about 0.1 mm and less than about 100 mm.

19. The system of claim 17, wherein a width of the first flow channel is greater than about 0.3 mm and less than about 5.0 mm, a width of the second flow channel is greater than about 0.3 mm and less than about 5.0 mm, and the chassis comprises at least one fluid introduction port or conduit connected to at least one of the first flow channel or second flow channel in the plurality of the filtering units.

20. The system of claim 17, wherein the isolator comprises a gasket.

21. The system of claim 17, further comprising a first flow channel spacer in the first flow channel and configured to maintain a width of the first flow channel.

22. The system of claim 17, further comprising a second flow channel spacer in the second flow channel and configured to maintain a width of the second flow channel.

23. The system of claim 17, wherein the process fluid comprises a gas stream including at least one of $CO_2$, $H_2O$, or a hydrocarbon.

24. A method of removing a target molecule from a process fluid, the method comprising:
providing a device for processing a process fluid, the device comprising:
a porous active material comprising at least one of an adsorbent, a sorbent or a catalyst; and a frame including an encapsulating structure configured to encapsulate the porous active material, comprising:

a porous first sheet on a first side of the porous active material, wherein a ratio of an area of the porous first sheet to a volume of the porous active material is greater than about 10 $m^2/m^3$ and less than about 10,000 $m^2/m^3$;

a porous second sheet parallel with the porous first sheet on a second side of the porous active material opposite the first side; and a seal around a perimeter of the porous active material and coupled to the porous first sheet and porous second sheet;

introducing the process fluid from a first flow channel into the porous first sheet and the porous active material;

flowing the process fluid through the porous active material; and discharging the process fluid from the porous active material through the porous second sheet and into a second flow channel.

25. The method of claim 24, wherein the porous active material comprises a chemically active material immobilized in the encapsulating structure, the porous active material has a void fraction greater than about 0.3 and less than about 0.8, the porous first sheet has a thickness less than 2 mm, the porous second sheet has a thickness less than 2 mm, and a width of the encapsulating structure is greater than about 0.1 mm and less than about 100 mm.

26. The method of claim 24, wherein a width of the first flow channel is greater than about 0.3 mm and less than about 5.0 mm, and a width of the second flow channel is greater than about 0.3 mm and less than about 5.0 mm.

27. The method of claim 24, wherein the target molecule comprises a water molecule.

28. A method of removing a target molecule from a process fluid, the method comprising:

providing a device for processing a process fluid, the device comprising:

a porous active material comprising at least one of an adsorbent, a sorbent or a catalyst; and a frame including an encapsulating structure configured to encapsulate the porous structure, comprising:

a porous first sheet on a first side of the porous active material, wherein a ratio of an area of the porous first sheet to a volume of the porous active material is greater than about 10 $m^2/m^3$ and less than about 10,000 $m^2/m^3$;

a nonpermeable second sheet parallel with the porous first sheet on a second side of the porous active material opposite the first side, wherein the nonpermeable second sheet has a thermal conductivity greater than about 10 W/m·K; and a seal around a perimeter of the porous active material and coupled to the porous first sheet and porous second sheet;

introducing the process fluid from a first flow channel into the porous first sheet and the porous active material to enable mass transfer of the target molecule between the process fluid and the porous active material by molecular diffusion; and introducing a heat exchange fluid from a second flow channel to the nonpermeable second sheet to enable heat transfer between the heat exchange fluid and the porous active material by thermal conduction.

29. The method of claim 28, wherein the porous active material comprises one or more chemically active materials immobilized in the encapsulating structure, the porous active material has a void fraction greater than about 0.3 and less than about 0.8, the porous first sheet has a thickness less than 2 mm, the porous second sheet has a thickness less than 2 mm, and a width of the encapsulating structure is greater than about 0.1 mm and less than about 100 mm.

30. The method of claim 28, wherein a width of the first flow channel is greater than about 0.3 mm and less than about 5.0 mm, and a width of the second flow channel is greater than about 0.3 mm and less than about 5.0 mm.

31. The method of claim 28, wherein the target molecule comprises at least one of $CO_2$, $H_2O$ or a hydrocarbon.

32. A method of removing ions from a process fluid, the method comprising:

providing a device for processing a process fluid, the device comprising:

a porous active material comprising at least one of an adsorbent, a sorbent or a catalyst; and a frame including an encapsulating structure configured to encapsulate the active material, comprising:

a porous first sheet on a first side of the porous active material, wherein a ratio of an area of the porous first sheet to a volume of the porous active material is greater than about 10 $m^2/m^3$ and less than about 10,000 $m^2/m^3$;

a porous second sheet parallel with the porous first sheet on a second side of the porous active material opposite the first side;

a fluid-permeable and electrically-insulating separator sheet between the porous first sheet and the porous second sheet, and a seal around a perimeter of the porous active material and coupled to the porous first sheet and porous second sheet;

introducing the process fluid from a first flow channel into the porous first sheet and the porous active material;

flowing the process fluid through the porous active material and the separator sheet;

discharging the process fluid from the porous active material through the porous second sheet and into a second flow channel; and applying an electrical voltage between the porous first sheet and the porous second sheet.

33. The method of claim 32, wherein the porous active material comprises one or more chemically active materials immobilized in the encapsulating structure, the porous active material has a void fraction greater than about 0.3 and less than about 0.8, the porous first sheet has a thickness less than 2 mm, the porous second sheet has a thickness less than 2 mm, and a width of the encapsulating structure is greater than about 0.1 mm and less than about 100 mm.

34. The method of claim 32, wherein a width of the first flow channel is greater than about 0.3 mm and less than about 5.0 mm, and a width of the second flow channel is greater than about 0.3 mm and less than about 5.0 mm.

* * * * *